US006631402B1

(12) United States Patent
Devine et al.

(10) Patent No.: US 6,631,402 B1
(45) Date of Patent: Oct. 7, 2003

(54) INTEGRATED PROXY INTERFACE FOR WEB BASED REPORT REQUESTER TOOL SET

(75) Inventors: Carol Y. Devine, Colorado Springs, CO (US); Tammy E. Dollar, Peyton, CO (US); Wayne J. Munguia, Colorado Springs, CO (US); Edward Schwarz, New York, NY (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/159,409

(22) Filed: Sep. 24, 1998

Related U.S. Application Data
(60) Provisional application No. 60/060,655, filed on Sep. 26, 1997.

(51) Int. Cl.[7] .............................................. G06F 15/16
(52) U.S. Cl. ........................ 709/217; 709/219; 709/229
(58) Field of Search ................................. 709/200, 202, 709/203, 205, 101, 102, 201, 219, 229, 232, 217

(56) References Cited

U.S. PATENT DOCUMENTS

| 4,160,129 A | 7/1979 | Peyser et al. |
| 4,345,315 A | 8/1982 | Cadotte et al. |
| 4,817,050 A | 3/1989 | Komatsu et al. |

(List continued on next page.)

FOREIGN PATENT DOCUMENTS

| EP | 0 809 387 A2 | 5/1997 |
| JP | 9064870 A | 3/1997 |
| WO | WO97/11443 | 3/1997 |
| WO | WO 97/16911 | 5/1997 |
| WO | WO 97/23988 | 7/1997 |
| WO | WO 98/19472 | 5/1998 |
| WO | WO 99/01826 | 1/1999 |
| WO | 00/11573 | 3/2000 |

OTHER PUBLICATIONS

"Cryptography and the Internet", www.echonyc.com/~ysue/crypt.html, 1995.
Lee et al., "Supporting Multi–User, Multi–Applet Workspaces in CBE", Computer Supported Cooperative Work 1996, Cambridge, MA.
"Netscape 2.0 Beta Hip or Hype?", www.plant.net.au/innovations/20beta.html, Planet Internet, 1995.
Kenney, Kathleen, "American Management Systems Launces Internet–Based Customer Care and Billing Tool for Telecom Firms", PR Newswire, New York, Oct. 9, 1996, extracted from http://proquest.umi.com on internet Feb. 28, 2002.
Morgan, Rick, "When Used Right, Internet can be Effective Marketing Tool", Madison Capital Times, Madison, WI, Nov. 8, 1996, extracted from http://proquest.umi.com on internet on Feb. 28, 2002.

(List continued on next page.)

Primary Examiner—Le Hien Luu
Assistant Examiner—Stephan Willett

(57) ABSTRACT

A Web/Internet based reporting system provides a common GUI enabling the requesting, customizing, scheduling and viewing of various types of reports generated by different server applications and/or application platforms. The reporting system includes a report manager, report scheduler and report requestor applications capable of defining, creating, managing and tracking specific reports that are available to customers in accordance with customer entitlements. Metadata messaging employed to enable specific report option presentation, report customization and report execution/scheduling options. A Web-based system infrastructure is provided that enables the acquisition and secure presentation of customer reports to customers from any client browser application.

26 Claims, 28 Drawing Sheets

U.S. PATENT DOCUMENTS

| | | |
|---|---|---|
| 4,823,373 A | 4/1989 | Takahashi et al. |
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,131,020 A | 7/1992 | Liebesny et al. |
| 5,136,707 A | 8/1992 | Block et al. |
| 5,223,699 A | 6/1993 | Flynn et al. |
| 5,228,076 A | 7/1993 | Hopner et al. |
| 5,245,533 A | 9/1993 | Marshall |
| 5,262,760 A | 11/1993 | Iwamura et al. |
| 5,285,494 A | 2/1994 | Sprecher et al. |
| 5,287,270 A | 2/1994 | Hardy et al. |
| 5,313,598 A | 5/1994 | Yamakawa |
| 5,315,093 A | 5/1994 | Stewart |
| 5,325,290 A | 6/1994 | Cauffman et al. |
| 5,327,486 A | 7/1994 | Wolff et al. |
| 5,361,259 A | 11/1994 | Hunt et al. |
| 5,369,571 A | 11/1994 | Metts |
| 5,452,446 A | 9/1995 | Johnson |
| 5,475,836 A | 12/1995 | Harris et al. |
| 5,481,542 A | 1/1996 | Logston et al. |
| 5,483,596 A | 1/1996 | Rosenow et al. |
| 5,490,060 A | 2/1996 | Malec et al. |
| 5,491,779 A | 2/1996 | Bezjian |
| 5,506,893 A | 4/1996 | Buscher et al. |
| 5,526,257 A | 6/1996 | Lerner |
| 5,530,744 A | 6/1996 | Charalambous et al. |
| 5,533,108 A | 7/1996 | Harris et al. |
| 5,537,611 A | 7/1996 | Rajagopal et al. |
| 5,539,734 A | 7/1996 | Burwell et al. |
| 5,548,726 A | 8/1996 | Pettus |
| 5,551,025 A | 8/1996 | O'Reilly et al. |
| 5,555,290 A | 9/1996 | McLeod et al. |
| 5,563,805 A | 10/1996 | Arbuckle et al. |
| 5,566,351 A | 10/1996 | Crittenden et al. |
| 5,586,260 A | 12/1996 | Hu |
| 5,602,918 A | 2/1997 | Chen et al. |
| 5,610,915 A | 3/1997 | Elliott et al. |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,650,994 A | 7/1997 | Daley |
| 5,659,601 A | 8/1997 | Cheslog |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,692,181 A | 11/1997 | Anand et al. |
| 5,694,546 A | 12/1997 | Reisman |
| 5,696,906 A | 12/1997 | Peters et al. |
| 5,699,403 A | 12/1997 | Ronnen |
| 5,699,528 A | 12/1997 | Hogan |
| 5,706,502 A | 1/1998 | Foley et al. |
| 5,708,780 A | 1/1998 | Levergood et al. |
| 5,710,882 A | 1/1998 | Svennevik et al. |
| 5,721,908 A | 2/1998 | Lagarde et al. |
| 5,721,913 A | 2/1998 | Ackroff et al. |
| 5,727,129 A | 3/1998 | Barrett et al. |
| 5,734,709 A | 3/1998 | DeWitt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,757,900 A | 5/1998 | Nagel et al. |
| 5,764,756 A | 6/1998 | Onweller |
| 5,768,501 A | 6/1998 | Lewis |
| 5,774,660 A | 6/1998 | Brendel et al. |
| 5,778,178 A | 7/1998 | Arunachalam |
| 5,778,377 A | 7/1998 | Marlin et al. |
| 5,781,550 A | 7/1998 | Templin et al. |
| 5,781,632 A | 7/1998 | Odom |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,790,809 A | 8/1998 | Holmes |
| 5,793,694 A | 8/1998 | Akiba et al. |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A | 9/1998 | Anderson et al. |
| 5,812,750 A | 9/1998 | Dev et al. |
| 5,815,080 A | 9/1998 | Taguchi |
| 5,815,665 A | 9/1998 | Teper et al. |
| 5,819,225 A | 10/1998 | Eastwood et al. |
| 5,819,271 A | 10/1998 | Mahoney et al. |
| 5,825,769 A | 10/1998 | O'Reilly et al. |
| 5,825,890 A | 10/1998 | Elgamal et al. |
| 5,826,029 A | 10/1998 | Gore, Jr. et al. |
| 5,826,269 A | 10/1998 | Hussey |
| 5,832,519 A | 11/1998 | Bowen et al. |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,233 A | 12/1998 | Radia et al. |
| 5,848,396 A | 12/1998 | Gerace |
| 5,848,399 A | 12/1998 | Burke |
| 5,850,517 A | 12/1998 | Verkler et al. |
| 5,852,810 A | 12/1998 | Sotiroff et al. |
| 5,852,812 A | 12/1998 | Reeder |
| 5,862,325 A | 1/1999 | Reed et al. |
| 5,867,495 A | 2/1999 | Elliott et al. |
| 5,875,236 A | 2/1999 | Jankowitz et al. |
| 5,877,759 A | 3/1999 | Bauer |
| 5,881,237 A | 3/1999 | Schwaller et al. |
| 5,883,948 A | 3/1999 | Dunn |
| 5,884,032 A | 3/1999 | Bateman et al. |
| 5,884,312 A | 3/1999 | Dustan et al. |
| 5,892,900 A | 4/1999 | Ginter et al. |
| 5,909,679 A | 6/1999 | Hall |
| 5,909,682 A | 6/1999 | Cowan et al. |
| 5,915,001 A | 6/1999 | Uppaluru |
| 5,920,542 A | 7/1999 | Henderson |
| 5,923,016 A | 7/1999 | Fredregill et al. |
| 5,930,764 A | 7/1999 | Melchione et al. |
| 5,930,804 A | 7/1999 | Yu et al. |
| 5,933,142 A | 8/1999 | LaStrange et al. |
| 5,937,165 A | 8/1999 | Schwaller et al. |
| 5,938,729 A | 8/1999 | Cote et al. |
| 5,949,976 A | 9/1999 | Chappelle |
| 5,953,389 A | 9/1999 | Pruett et al. |
| 5,956,714 A | 9/1999 | Condon |
| 5,958,016 A | 9/1999 | Chang et al. |
| 5,960,411 A | 9/1999 | Hartman et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |

| | | |
|---|---|---|
| 5,982,891 A | 11/1999 | Ginter et al. |
| 5,983,350 A | 11/1999 | Minear et al. |
| 5,991,733 A | 11/1999 | Aleia et al. |
| 5,991,746 A | 11/1999 | Wang |
| 5,991,806 A | 11/1999 | McHann, Jr. |
| 5,995,948 A | 11/1999 | Whitford et al. |
| 5,999,525 A | 12/1999 | Krishnaswamy et al. |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,011,844 A | 1/2000 | Uppaluru et al. |
| 6,012,090 A | 1/2000 | Chung et al. |
| 6,014,647 A | 1/2000 | Nizzari et al. |
| 6,014,702 A | 1/2000 | King et al. |
| 6,023,762 A | 2/2000 | Dean et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,041,357 A | 3/2000 | Kunzelman et al. |
| 6,044,144 A | 3/2000 | Becker et al. |
| 6,044,362 A | 3/2000 | Neely |
| 6,049,602 A | 4/2000 | Foladare et al. |
| 6,049,786 A | 4/2000 | Smorodinsky |
| 6,052,450 A | 4/2000 | Allison et al. |
| 6,058,170 A | 5/2000 | Jagadish et al. |
| 6,058,381 A | 5/2000 | Nelson |
| 6,064,667 A | 5/2000 | Gisby et al. |
| 6,065,002 A | 5/2000 | Knotts et al. |
| 6,072,493 A | 6/2000 | Driskell et al. |
| 6,073,105 A | 6/2000 | Sutcliffe et al. |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,105,131 A | 8/2000 | Carroll |
| 6,108,700 A | 8/2000 | Maccobee et al. |
| 6,108,782 A | 8/2000 | Fletcher et al. |
| 6,112,238 A | 8/2000 | Boyd et al. |
| 6,115,040 A * | 9/2000 | Bladow et al. ............ 709/203 |
| 6,115,458 A | 9/2000 | Taskett |
| 6,115,693 A | 9/2000 | McDonough et al. |
| 6,115,737 A | 9/2000 | Ely et al. |
| 6,119,109 A | 9/2000 | Muratani et al. |
| 6,122,258 A | 9/2000 | Brown |
| 6,128,624 A | 10/2000 | Papierniak et al. |
| 6,130,933 A | 10/2000 | Miloslavsky |
| 6,131,095 A | 10/2000 | Low et al. |
| 6,131,116 A | 10/2000 | Riggins et al. |
| 6,134,584 A * | 10/2000 | Chang et al. ............... 709/219 |
| 6,137,869 A | 10/2000 | Voit et al. |
| 6,145,001 A | 11/2000 | Scholl et al. |
| 6,154,744 A | 11/2000 | Kenner et al. |
| 6,161,102 A * | 12/2000 | Yanagihara et al. |
| 6,161,128 A | 12/2000 | Smyk |
| 6,163,597 A | 12/2000 | Voit |
| 6,173,311 B1 | 1/2001 | Hassett et al. |
| 6,182,113 B1 * | 1/2001 | Narayanaswami .......... 709/203 |
| 6,205,456 B1 * | 3/2001 | Nakao |
| 6,212,506 B1 | 4/2001 | Shah et al. |
| 6,212,558 B1 | 4/2001 | Antur et al. |
| 6,240,450 B1 | 5/2001 | Sharples et al. |
| 6,253,239 B1 | 6/2001 | Shklar et al. |
| 6,275,490 B1 | 8/2001 | Mattaway et al. |
| 6,286,050 B1 | 9/2001 | Pullen et al. |
| 6,292,481 B1 | 9/2001 | Voit et al. |
| 6,295,551 B1 | 9/2001 | Roberts et al. |
| 6,337,858 B1 | 1/2002 | Petty et al. |
| 6,377,993 B1 | 4/2002 | Brandt et al. |
| 2001/0001014 A1 | 5/2001 | Akins, III et al. |
| 2001/0003828 A1 * | 6/2001 | Peterson et al. ............ 709/219 |

OTHER PUBLICATIONS

Edwards, Morris, "The Electronic Commerce Juggernaut", Communication News, Nokomis, Sep. 1997, vol. 34, Issue 9, extracted from http://proquest.umi.com on Internet on Feb. 28, 2002.

Quadri et al., Hewlett–Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value–added Services", Copyright 1998 Cisco Systems, Inc. http://www.cisco.com/warp/public/146/pressroom/1998/apr98/28.html.

HP Smart Internet, "Transform User Data Into Revenue", Copyright Hewlett–Packard Company, 1999.

HP Smart Internet Usage Analysis Solution, "Transform User Data Into Competitive Advantage", Copyright Hewlett–Packard Company, 1999.

HP/Cisco, Internet Usage Platform, "Transforming Internet Services Into Revenue" ©Hewlett–Packard Co. 1998.

"Release Note for Netflow FlowCollector Release 2.0," ©Jul. 1998 and "Release Notes for Netflow FlowAnalyzer Release 1.0" ©Sep. 1997.

HP Invent, "Capturing the Usage Billing Advantage", Copyright 1994–2001, Hewlett Packard http://www.hp.com/communictions/usage/infolibrary/whitepapers/dsforum_print.html.

Anonymous, "Call Accounting Products", Teleconnect vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

Biggs, M., "Help for the Web enhances customer support, reduces help desk load"*Inforworld,* Jun. 16, 1997, v. 19, No. 24, pp. 82+.

Burch, B., "AT&T, MCI to release new management tools", *Network World,* Jan. 17, 1994, p. 19.

Low, C., "Integrating Communication Services", *IEEE Communication Magazine,* Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE,* pp. 205–214, 1997.

Porter, T., "MCI offers tracking system: Direct Dispatch lets users eye problems remotely", *Service News,* Apr. 1994, p. 17.

Shklar, L. et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *Info World,* v. 18, Issue 37, Sep. 9, 1996.

Yager, T., "Mixed Messages", *UNIX Review,* v. 16, n. 2, p. 29, Feb. 1998.

"Carriers Improve Net Management Services", *Communications Week,* May 2, 1994, p. 74.

"Network management; new software platform enhances network management capabilities; MCI Service View offers greater cost savings, increased flexibility." Product Announcement, *Edge,* Oct. 2, 1995, on & about AT&T, v. 10, n. 375, p. 11(1).

"New software platform enhances network management capabilities . . .", *Business Wire,* Sep. 28, 1995 p. 9281122.

"User'Guide: Microsoft Access", Microsoft Corporation, 1994, pp. 378,594–599, 630–632 (13).

Jainschigg, J., "Billing confirmed: this easy–to–use box turns guest calls into revenue." *Teleconnect,* vol. 12, No. 9, p. 39(4).

Chapman, D. Brent et al., "Building Internet Firewalls", Nov. 1995, O'Reilly & Associates, p. 58.

He, Taniguchi, "Internet Traffic Control and Management Architecture", IEEE, Oct. 22–24, 1998, pp. s46–03–1–s46–03–5.

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Meterology; Databases, "Inforonics offers controlled access to Web Meterology", Information Today, Apr. 97, vol. 14 Issue 4, p53, 2p. This article reports that Inforonics has developed a controlled access gateway to MGA (Meterological and Geoastrophysica).

Rosen, Michele, "BPCS steps into new millennium", Midrange Systems; Spring House; May 10, 1996. This article informs about the new release of BPCS Client/Server Software as the most extensive upgrade of the product since 1980s. It incorporates onject tech.

Inoue et al., "Secure Mobile IP Using Security Primitives", IEEE 1997.

*Computer Networks,* Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

"Help–Desk Market Seeks Suite Success", Computer Reseller News, Jan. 5, 1998, p. 49.

* cited by examiner

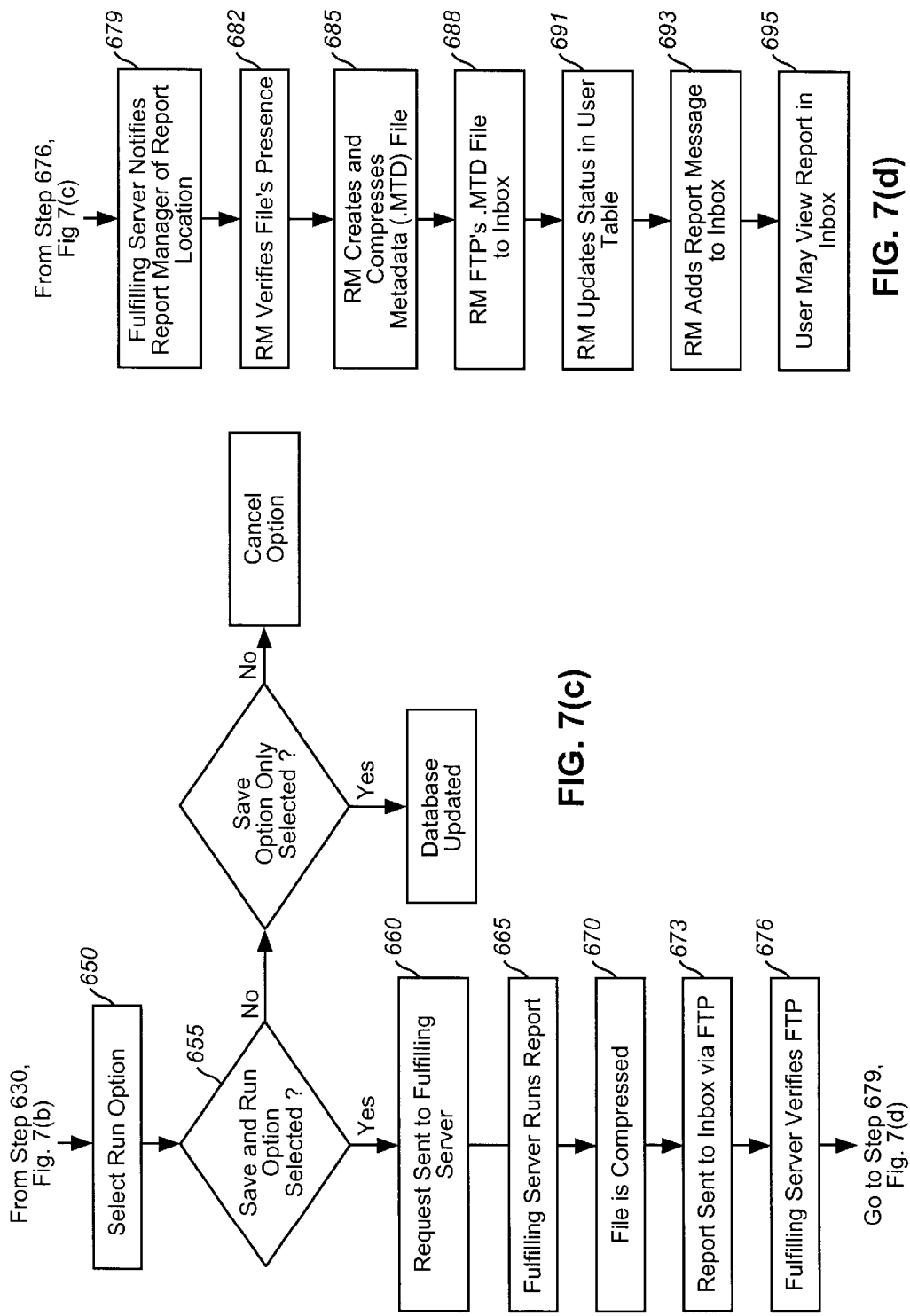

INTEGRATED PROXY INTERFACE FOR WEB BASED REPORT REQUESTER TOOL SET

CROSS-REFERENCE TO RELATED APPLICATIONS

The following patent application claims the benefit of U.S. Provisional Patent Application Ser. No. 60/060,655 filed Sep. 26, 1997.

FIELD OF THE INVENTION

The present invention relates generally to information delivery systems and, particularly, to a novel, WWW/Internet-based, reporting service for customers requesting information located at remote back-end intranet servers of telecommunications service entities.

BACKGROUND OF THE INVENTION

Major telecommunications service entities, e.g., MCI, AT&T, and Sprint, presently provide for the presentation and dissemination of customer account and network management information to their customers predominantly through a Windows-based graphical user interface resident on their computer workstation. Typically, service entity customers are enabled to directly dial-up, e.g., via a modem, or, alternately, via dedicated communication lines, e.g., ISDN, T-1, etc., to the entity's application and database servers, and initiate the generation of reports of their requested account information through the reporting GUI. The report requests initiated by the customer are processed by the entity's application server, which retrieves the requested customer information from one or more databases, processes and formats the information for downloading to the client's reporting GUI.

It is the case that the telecommunications service providers provide many different services, and many of the associated service applications have been developed independently over time, and, operate on many different operating platforms. For instance, MCI's Service View platform ("MSV") provides for the generation of Toll-free Network Management data, priced call detail or "Perspective" data for usage analysis and trending, and unpriced call detail or real-time "TrafficView" data each of which requires a different reporting mechanism due to the nature of the data being presented. For example, much of the customers "Perspective" data is provided in a CD-ROM media and shipped to the customer, usually on a monthly basis, and requires extensive client-side processing to utilize the data. This cuts down on computing resources as the customer requires a dedicated application and GUI to process this type of data. Moreover, such reporting systems typically do not provide any report customization or presentation options for the customer, and any reporting customization is provided by an application specific program running on the client workstation. Furthermore, such systems do not readily provide for the scheduling of periodic or ad hoc "one-shot" reports.

It would be highly desirable to provide an Intranet/Internet/Web-based reporting system that provides a common GUI enabling both report requesting, customizing and viewing of various types of data from different server applications.

Furthermore, it would be desirable to provide an Intranet/Internet/Web-based reporting system including a report manager and requesting tool that manages the generation and presentation of specific reports that are available to customers, and enables specific report customization and scheduling options.

It would also be highly desirable to provide a Intranet/Internet/Web-based reporting system infrastructure capable of providing for the secure initiation, acquisition and presentation of customer reports to customers from any computer workstation running a browser located anywhere in the world.

SUMMARY OF THE INVENTION

The present invention is directed to a novel Intranet/Internet/Web-based reporting system that provides a common GUI enabling the requesting, customizing, scheduling and viewing of various types of reports generated by different server applications and/or application platforms. More specifically, the present invention includes an Intranet/Internet/Web-based reporting system infrastructure employing report manager and report scheduler server components, and report requester and viewer client components enabling customers to define various reports relating to their telecommunications network usage, in addition to managing the generation and presentation of specific reports. This infrastructure employs novel authentication and security features providing for the secure acquisition and compilation of customer reporting data, configuration and generation of reports, and presentation of reports on the customers workstation via a standard web browser. Further employed is an integrated proxy interface that reformats specific browser-based commands and communicates them to one or more corporate back-end fulfilling servers comprising a legacy system infrastructure to provide various data reports for customers.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings and in which:

FIGS. 7(a)–7(d) illustrate flow diagrams depicting the report request/scheduling process 600 implemented by StarWRS Report Manager and Report Requestor tools of the invention;

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;
2) a network architecture defining the physical network needed to satisfy the security and data volume requirements of the networkMCI System;
3) a data architecture detailing the application, back-end or legacy data sources available for networkMCI Interact; and
4) an infrastructure covering security, order entry, fulfillment, billing, self-monitoring, metrics and support.

Each of these common component areas will be generally discussed hereinbelow. A detailed descriptions of each of these components can be found in a related, co-pending U.S. patent application Ser. No. 09/159,695, entitled INTEGRATED CUSTOMER INTERFACE SYSTEM FOR COMMUNICATIONS NETWORK MANAGEMENT, the disclosure of which is incorporated herein by reference thereto.

Figure 1:
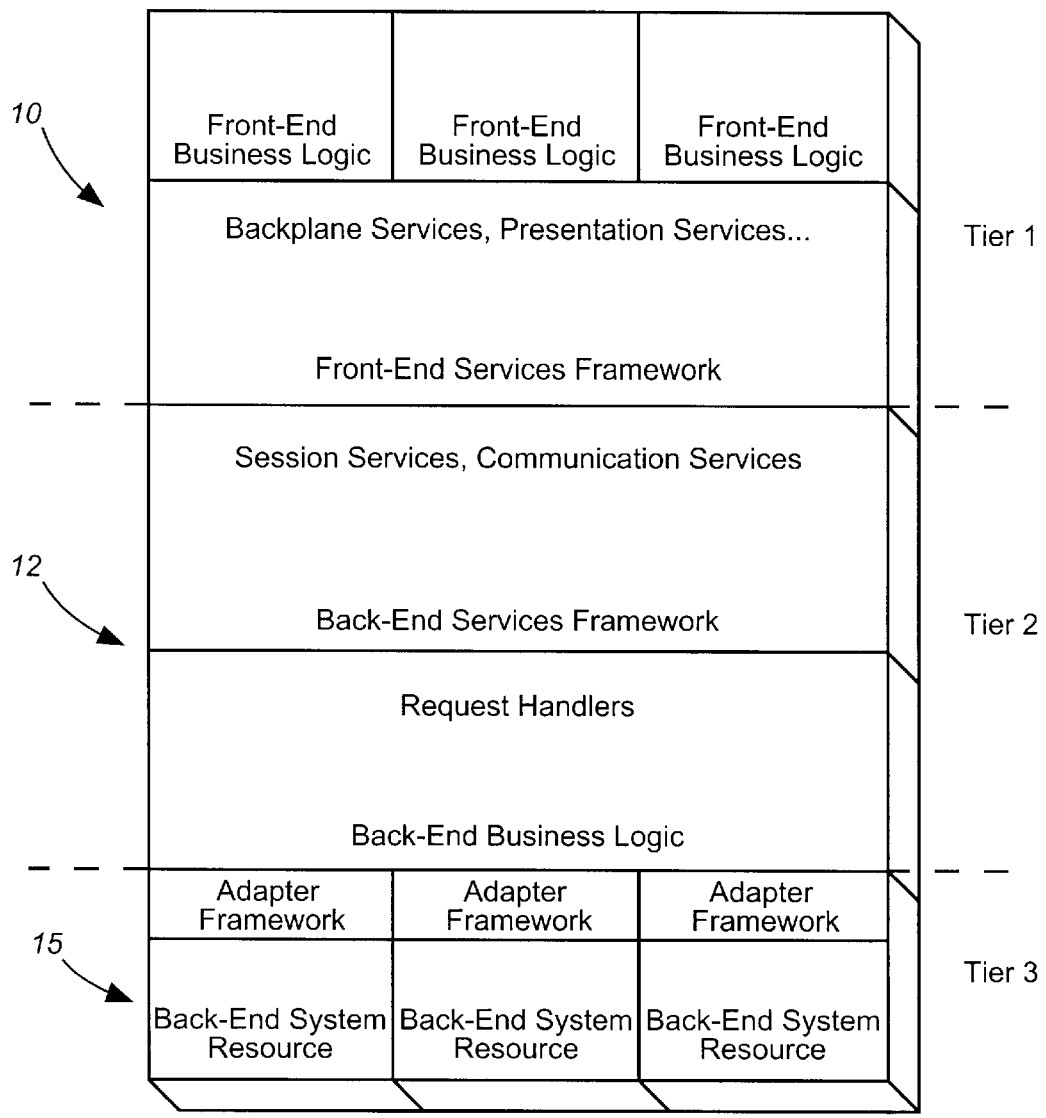
FIG. 1 illustrates the software architecture component comprising a three-tiered structure.

FIG. 1 is a diagrammatic illustration of the software architecture component in which the present invention functions. A first or client tier 10 of software services are resident on a customer work station 10 and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite.

A second or middle tier 12, is provided having secure web servers and back end services to provide applications that establish user sessions, govern user authentication and their entitlements, and communicate with adaptor programs to simplify the interchange of data across the network.

A third or back end tier 15 having applications directed to legacy back end services including database storage and retrieval systems and one or more database servers for accessing system resources from one or more legacy hosts.

Generally, as explained in co-pending U.S. patent application Ser. No. 09/159,515, now issued as U.S. Pat. No. 6,115,040, entitled GRAPHICAL USER INTERFACE FOR WEB ENABLED, APPLICATIONS, the disclosure of which is incorporated herein by reference thereto, the customer workstation includes client software capable of providing a platform-independent, browser-based, consistent user interface implementing objects programmed to provide a reusable and common. GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality-delivered through the system being of two-types: 1) cross-product, for example, inbox and reporting functions, and 2) product specific, for example, toll free network management or Call Manager functions. The system is capable of delivering to customers the functionality appropriate to their product mix.

Figure 2:
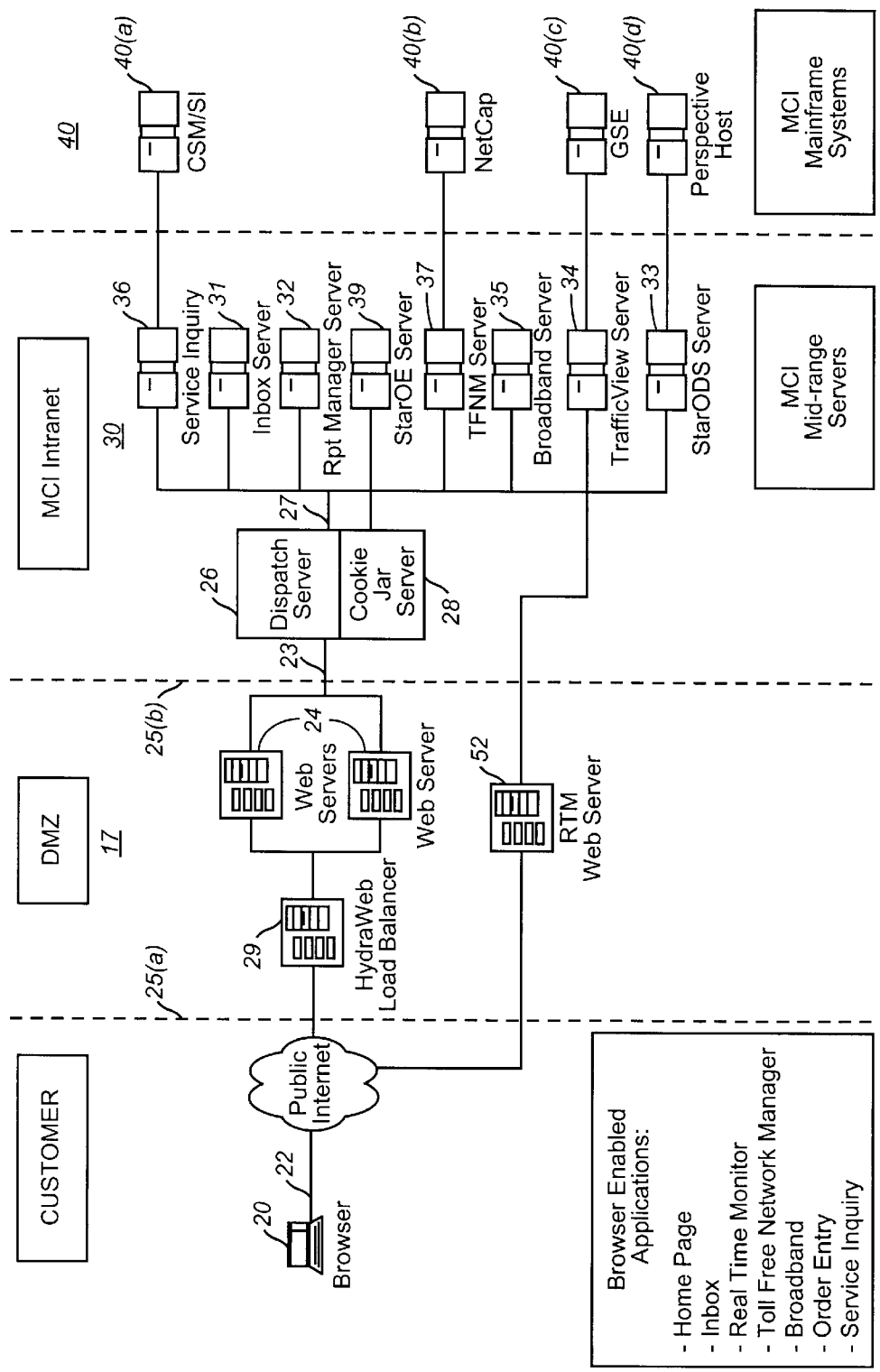
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
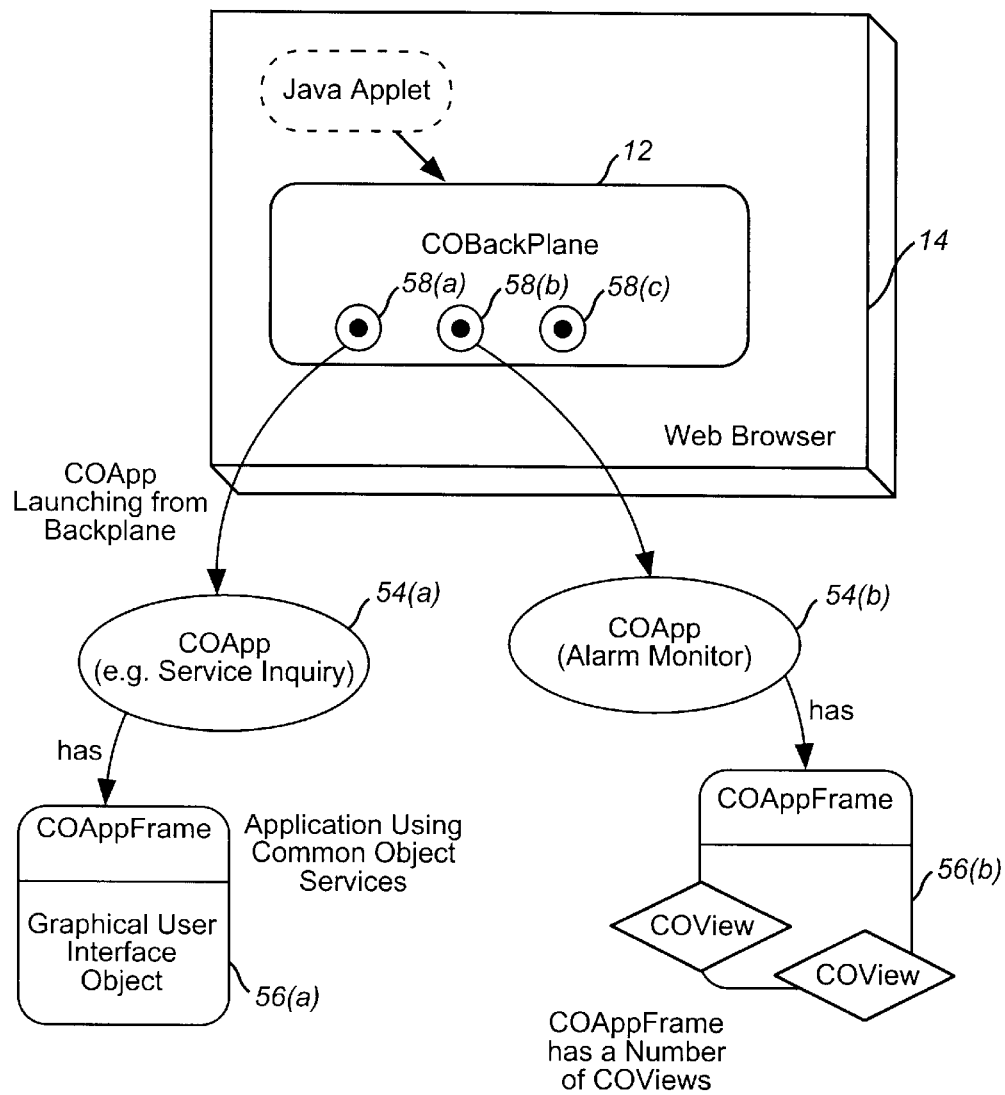
FIG. 3 is an illustrative example of a backplane architecture schematic.

The Customer Browser 20, is browser enabled and includes client applications responsible for presentation and front-end- services. Its functions include providing a user interface to various MCI services and supporting communications with MCI's Intranet web server cluster 24. As illustrated in FIG. 3, and more specifically described in the above-mentioned, co-pending U.S. patent application Ser. No. 09/159,515, now issued as U.S. Pat. No, 6,115,040, entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects which provide the front end business logic and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which can be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
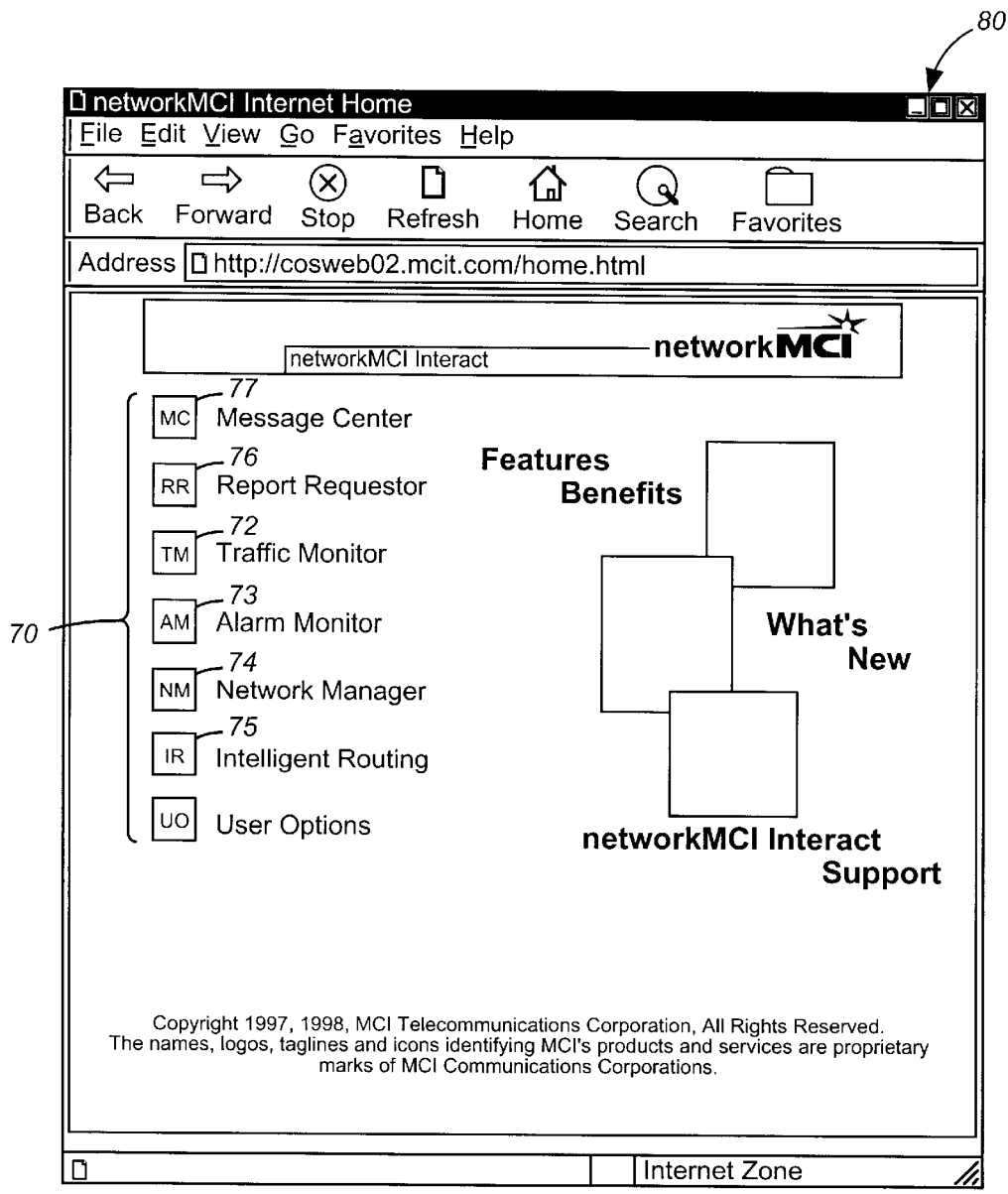
FIG. 4 illustrates an example client GUI presented to the client/customer as a browser web page.

FIG. 4 illustrates an example client GUI presented to the client/customer as a browser web page 80 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed reports for the client/customer and a Message Center 77 for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchapp( ) method. The launched application then may use the backplane for inter-application communications, including retrieving Inbox data.

The COBackPlane 12 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second socket connection 23 to the dispatch server 26 inside the enterprise Intranet.

As described in greater detail in co-pending U.S. patent application Ser. No. 09/159,514, entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 49 at logon time and cached.

If the requester is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and receiving notification of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(*a*). Such network management and customer network data is additionally accessible by authorized MCI management personnel. As shown in FIG. 2, other legacy platforms 40(*b*), 40(*c*) and 40(*d*) may also communicate individually with the Intranet servers for servicing specific transactions initiated at the client browser. The illustrated legacy platforms 40(*a*)–(*d*) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
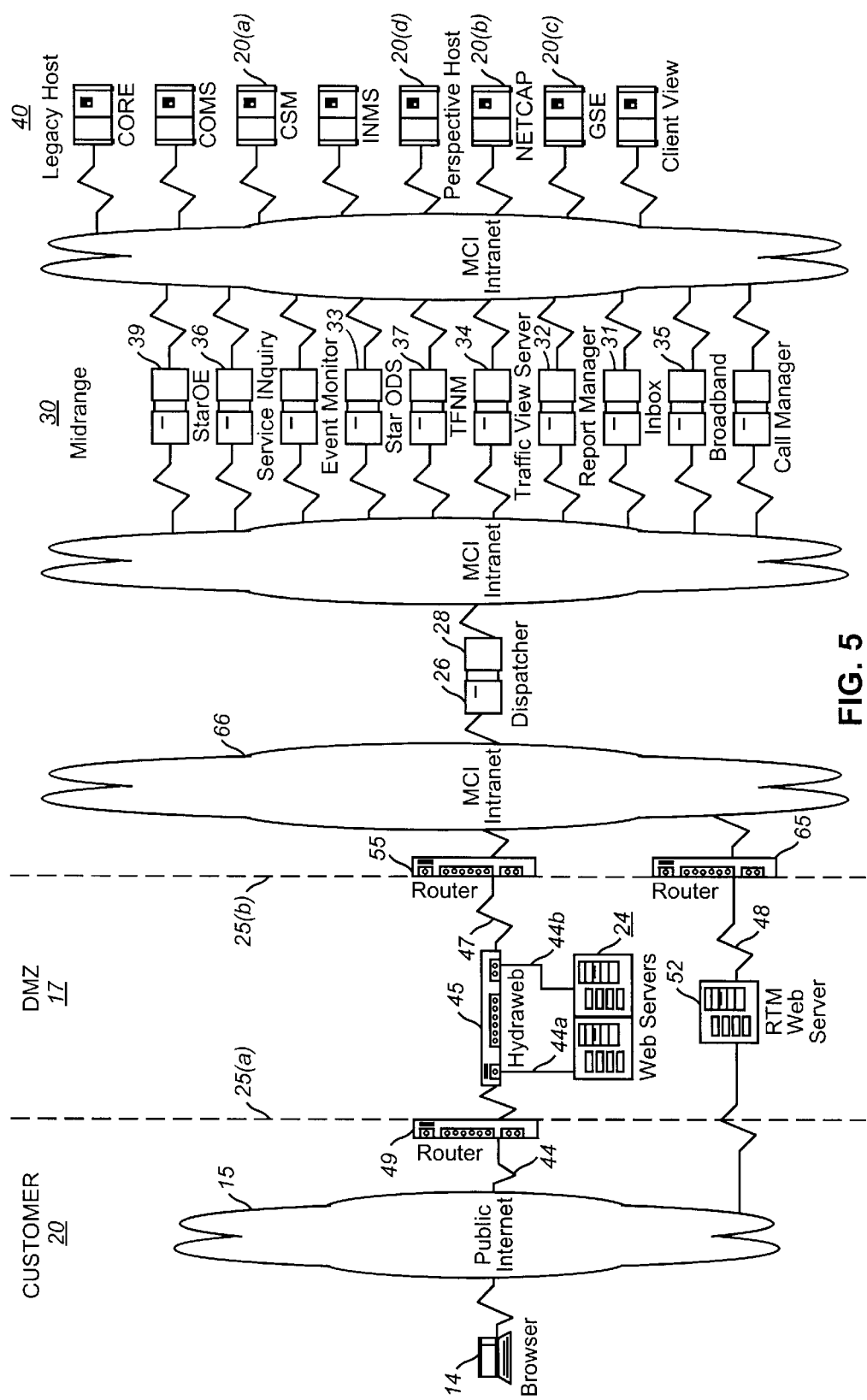
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 5, the present invention includes a double or complex firewall system that creates a "demilitarized zone" (DMZ) between two firewalls 25*a*, 25*b*. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 29a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The Hydraweb™ unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb™ unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the Hydraweb™ unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516, entitled INTEGRATED PROXY INTERFACE FOR WEB BASED TELECOMMUNICATIONS MANAGEMENT TOOLS, incorporated by reference as if fully set forth herein, this RTM server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWeb™ 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. 09/159,695, the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report viewer GUI application interface which support spreadsheet, a variety of graph and chart type, or both simultaneously. For example, the spreadsheet presentation allows for sorting by any arbitrary set of columns. The report viewer may also be launched from the inbox when a report is selected.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in a Report Manager server database and managed by the Report Manager server.

The Infrastructure component of the nMCI Reporting system includes means for providing secure communications regardless of the data content being communicated. As described in detail in above-referenced, co-pending U.S. patent application Ser. No. 09/159,514, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. ,As explained in further detail in co-pending U.S. patent application Ser. No. 09/159,515, now issued, as U.S. Pat. No. 6,115,040, the client-tier software is organized into a "component" architecture supporting such applications as inbox fetch and inbox management, report viewer and report requestor, TFNM, Event Monitor, Broadband, Real-Time Monitor, and system administration applications. Further functionality integrated into the software architecture includes applications such as Outbound Network Manager, Call Manager, Service Inquiry and Client View.

Figure 6:
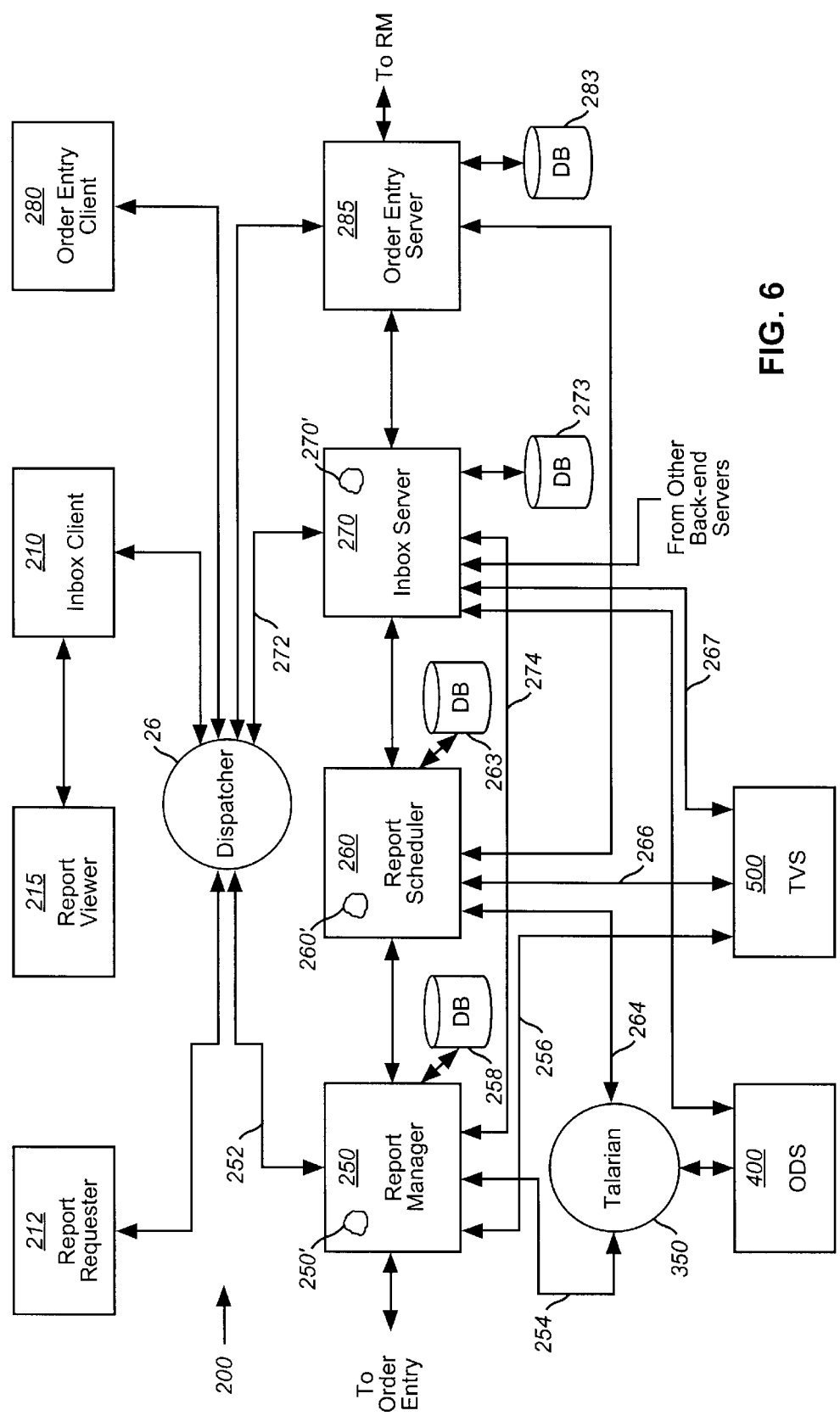
FIG. 6 is a block diagram depicting the physical architecture of the StarWRS component of networkMCI Interact system.
Figure 7A:
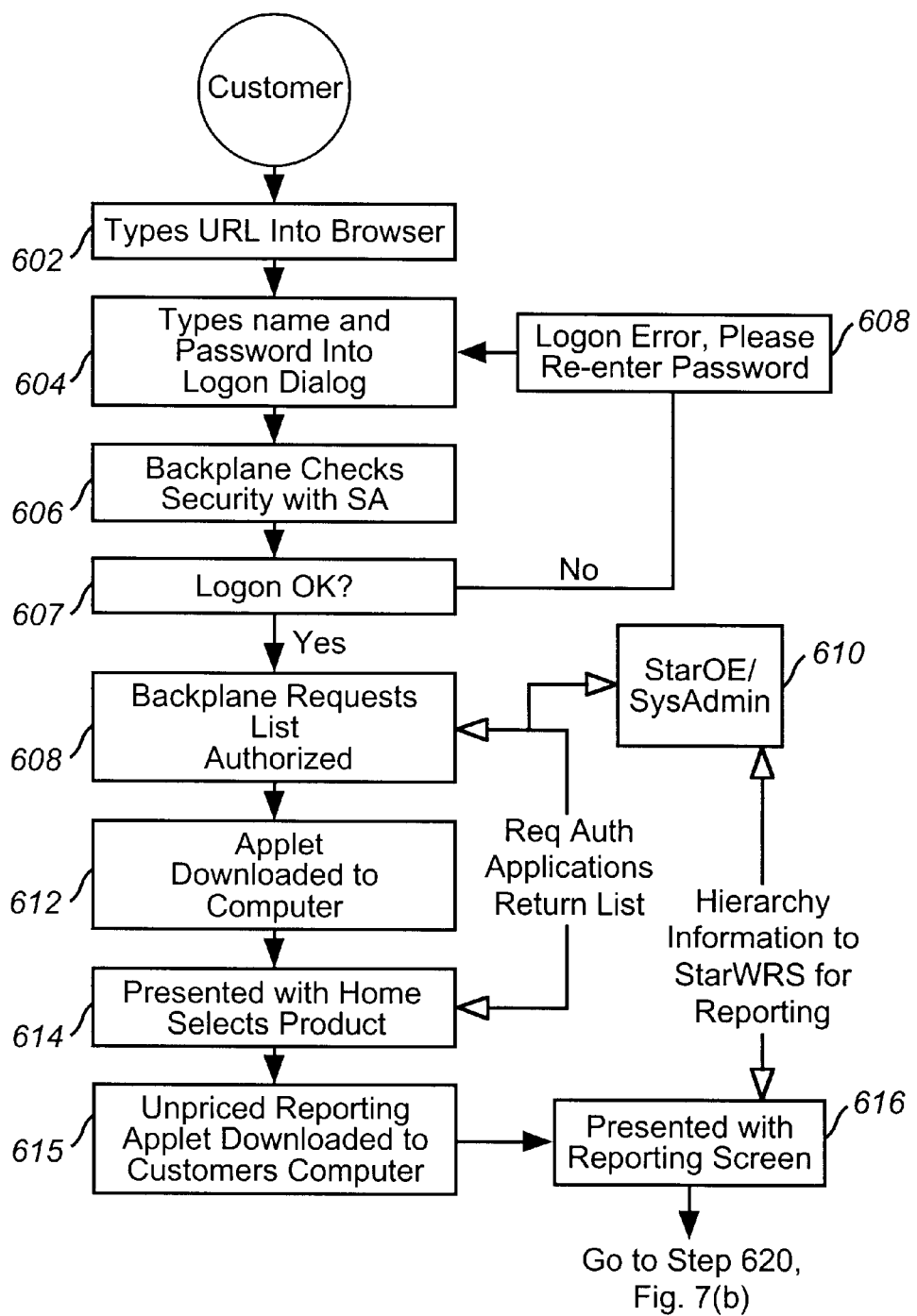
Figure 7B:
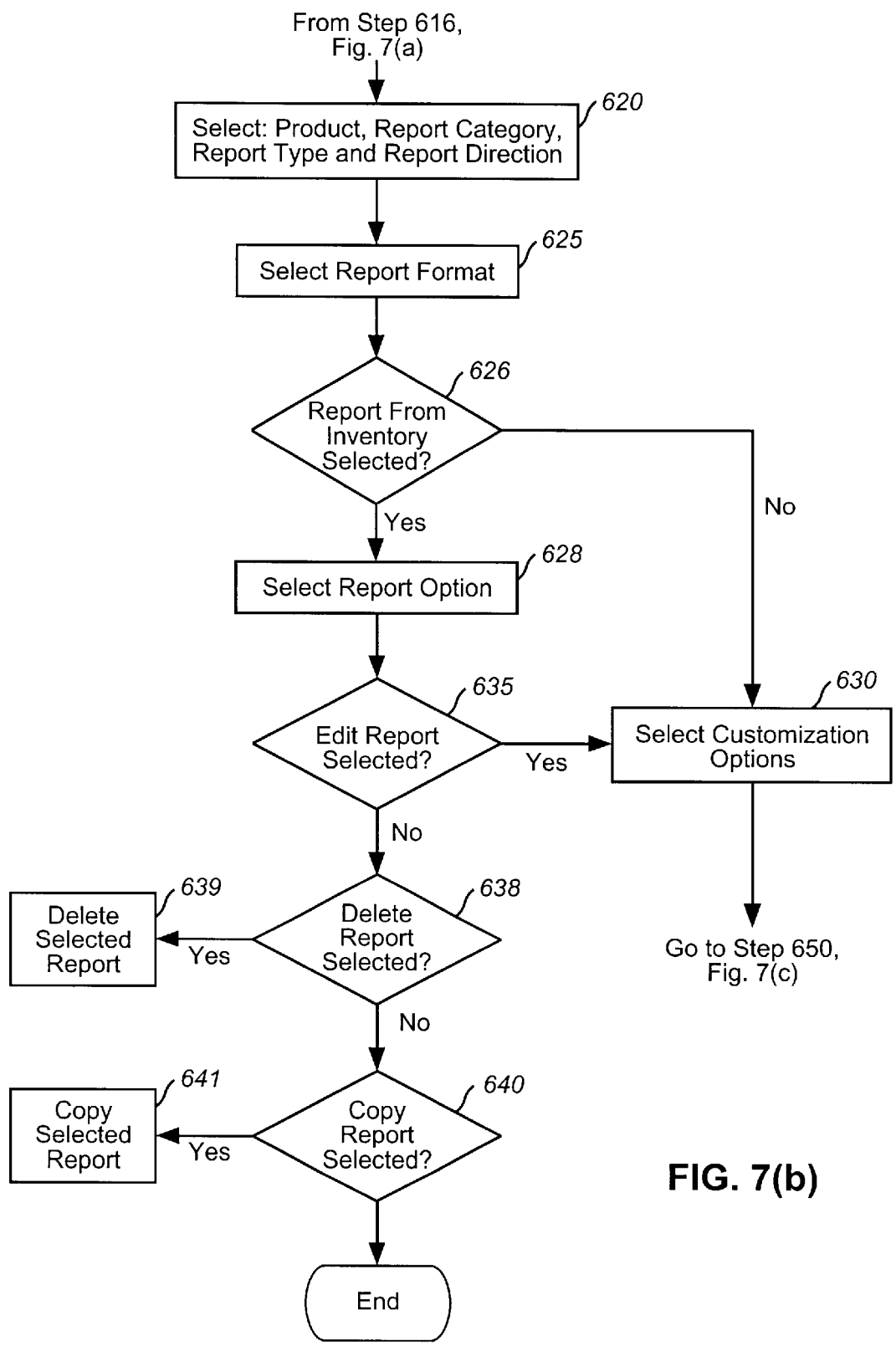

The present invention focuses on the client and middle-tier service and application proxy components that enable customers to request, specify, customize, schedule and receive their data and account information in the form of reports that are generated by the various back-end application servers. Referred to herein as "StarWRS", this WWW/Internet Reporting System 200, as shown in FIG. 6, comprises the following components and messaging interfaces:

1) those components associated with the Client GUI front end including a report requestor client application 212, a report viewer client application 215 and, an Inbox client application 210 which implement the logical processes associated with a "Java Client", i.e., employs Java applets launched from the backplane (FIG. 3) that enable the display and creation of reports and graphs based on the fields of the displayed reports, and, allows selection of different reporting criteria and options for a given report; and, 2) those middle-tier server components enabling the above-mentioned reporting functionality including: a Report Manager server 250, a Report scheduler server 260, and an Inbox Server 270. Also shown in FIG. 6 are the system Order Entry client application 280 and a corresponding Order Entry Server 285 supporting the StarWRS reporting functionality as will be described.

Each of these components will now be described with greater particularity hereinbelow.

The Report Manager ("RM") server 250 is an, application responsible for the synchronization of report inventory with the back-end "Fulfilling" servers 400, 500; retrieval of entitlements, i.e., a user's security profiles, and report pick list information, i.e., data for user report customization options, from the system Order Entry server 280; the transmission of report responses or messages to the Dispatcher server 26 (FIG. 6); the maintenance of the reporting databases; and, the management of metadata used for displaying reports. In the preferred embodiment, the RM server 250 employs a Unix daemon that passively listens for connect requests from the GUI client applications and other back-end servers and deploys the TCP/IP protocol to receive and route requests and their responses. Particularly, Unix stream sockets using the TCP/IP protocol suite are deployed to listen for client connections on a well-known port number on the designated host machine. Client processes, e.g., report requestor 212, desiring to submit requests connect to RM 250 via the dispatcher 26 by providing the port number and host name associated with RM 250. For particular back-end server 400 providing priced reporting data, a Talarian smart socket connection 254 is provided. Request messages received by the RM server are translated into a "metadata" format and validated by a parser object built into a report manager proxy 250' that services requests that arrive from the GUI front-end. If the errors are found in the metadata input, the RM 250 will return an error message to the requesting client. If the metadata passes the validation tests, the request type will be determined and data will be retrieved in accordance with the meta data request after which a standard response will be sent back to the requesting client. As shown in FIG. 6, interface sockets 252 are shown connecting the Dispatcher server 26 and the RM server 250 and, other socket connections 254, 256 are shown interfacing with respective back end servers 400 and 500. In one embodiment, server 400 provides a customer's priced billing data through a Talarian smart socket messaging interface 254 to the Report Manager. Particularly, as described in commonly owned, co-pending U.S. patent application Ser. No. 09/159,684, a back-end billing mainframe application known as the StarODS server provides such priced call detail data. Additionally, as shown in FIG. 6 and described in commonly owned, co-pending U.S. patent application Ser. No. 09/159,404, the contents and disclosure of which are incorporated by reference as if fully set forth herein, call detail data is FTP'd directly to the Inbox Server and a message is sent to the report manager server 250 from the Traffic View server ("TVS") 500. Although not shown in FIG. 6 it should be understood that the RM 250 server can manage reporting data for customer presentation from other back-end and legacy servers including, e.g., Broadband, Toll Free Network Management, and Event Monitor servers, etc. in order to present to a customer these types of network management and reporting data.

The report manager server additionally utilizes a database 258, such as provided by Informix, to provide accounting of metadata and user report inventory. Preferably, an SQL interface is utilized to access stored procedures used in processing requests and tracking customer reports. A variety of C++ tools and other tools such as Rogue Wave's tools.h++ are additionally implemented to perform metadata message parsing validation and translation functions.

The Report Manager server 250 additionally includes the scheduling information, however, a report scheduler server component passes report requests to the back-end fulfilling servers 400, 500 at the scheduled times.

Particularly, the Report Scheduler ("IRS") server component 260 is, in the preferred embodiment, a perpetually running Unix daemon that deploys the TCP/IP protocol to send report requests to the back-end fulfilling servers such as the StarODS server 400, TVS server 500, and receive their responses. More particularly, the RS server 260 is a Unix server program that is designed to handle and process report requests to the fulfilling servers by deploying Unix stream sockets using the TCP/IP protocol suite, sending the request for customized reports to client connections on a well-known port number on the designated host machine. As shown in FIG. 6, interface socket connections 264, 266 are shown interfacing with respective back end servers 400 and 500. In the case of priced billing data from StarODS 400, report requests are published by the RS server 260 to a pre-defined subject on the Talarian Server. When handling other incoming messages published by back end servers using Talarian SmartSockets 4.0, another daemon process is necessary that uses Talarian C++ objects to connect their message queue and extract all messages for a given subject for storage in a database table contained in database 263. Each message includes the track number of the report that was requested from the fulfilling server.

From the report requester interface, the user may specify the type of reporting, including an indication of the scheduling for the report, e.g., hourly, daily, weekly or monthly. For priced data the user has the option of daily, weekly, or monthly. For real-time, or unpriced data, the user has the option of hourly, daily, weekly or monthly. The report scheduler interface additionally enables a user to specify a pager or E-mail account so that an e-mail or pager message may be sent to indicate when a requested report is in the Inbox server 270.

As shown in FIG. 6, the report scheduler server 260 interfaces directly with the Report Manager server 250 to coordinate report request scheduling and processing. It should be understood that the respective report management and scheduling functions could be performed in a single server.

The Inbox Server component 270 serves as the repository where the completed user report data is stored, maintained, and eventually deleted and is the source of data that is uploaded to the client user via the dispatcher over a secure socket connection 272 between the Web server and the browser. It is also a Unix program that is designed to handle and process user requests submitted in meta data format using an Informix database. Once report results are received from the StarODS 400 and TVS 500 and any other back-end or fulfilling servers (not shown), the Report Manager server 250 communicates the corresponding report metadata to the Inbox server 270 over socket connection 274 as shown in FIG. 6. The metadata will be stored in the Inbox server database 273 along with the report results. Thus, if the meta data is required to be changed, it will not interfere with the information needed to display the reports contained in the Inbox. Additionally, as shown in FIG. 6, the Inbox server interfaces with the report scheduler to coordinate execution and presentation of reports.

The StarOE server 280 is the repository of user pick lists and user reporting entitlements as shown in database 283. Particularly, it is shown interfacing with the Inbox server 270 and report scheduler servers 260. The Report Manager does not interface with or contain metadata for StarOE. It will, however, include information in the report metadata that will tell the Report Requestor it needs to get information (i.e., Pick Lists) from StarOE server 285.

A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc. An MCI Internet StarOE server will manage the data base for the common configuration of data.

With regard to the front-end client GUI components, the above-mentioned Inbox client application 210 functions as an interface between the client software and the Inbox server 270 for presenting to the customer the various type of reports and messages received at the Inbox including all completed reports, call detail, and marketing news messages. Preferably, the messages for the user in the inbox are sorted by type (report, call detail, alarms) and then by report type, report name, date, and time.

Particularly, the Inbox client application uses the services of the backplane (FIG. 3) to launch other applications as needed to process report messages. The inbox will also use the services of the data export objects to provide a save/load feature for inbox messages, and, is used to provide a user-interface for software upgrade/download control. Inbox messages are generated by the versioning services of the backplane; actual downloads will be accomplished by a request through the inbox.

In the preferred embodiment, the inbox client is able to receive information on multiple threads to allow a high priority message to get through even if a large download is in progress. Typically, the browser is configured to allow more than one network connection simultaneously, i.e., the polling thread on the client uses a separate connection to check for new messages, and starts a new thread on a new connection when a new message is detected. In this way, multiple messages may be downloaded simultaneously.

The Report Requestor application 212 is a GUI Applet enabling user interaction for managing reports and particularly includes processes supporting: the creation, deletion, and editing of the user's reports; the retrieval and display of reports based on selected criteria; the display of selected option data; and the determination of entitlements which is the logical process defining what functionality a user can perform on StarWRS. In the preferred embodiment, the Report requester additionally enables a user to specify the frequency of report generation, e.g., periodically, or as "one-shots" to be performed at a later time. As described herein, the report scheduler service maintains a list of requested reports for a given user, and forwards actual report requests to the appropriate middle-tier servers at the appropriate time. Additional functionality is provided to enable customers to manage their inventory, e.g., reschedule, change, or cancel (delete) report requests.

In the preferred embodiment, the report requestor utilizes the platform client JAVA code to communicate with the report manager server. To communicate with the StarOE for user security, hierarchy, paging and e-mail, etc. the Report Requestor uses StarOE client Java code. Report Requestor JAVA applets implementing the above-described report requestor functionality, are downloaded to the the customer's workstation in the form of a cab file after initial login.

The Report Viewer application 215 is a GUI Applet enabling a user to analyze and display the data and reports supplied from the fulfilling servers such as StarODS 400, Traffic View ("TVS") 500, and other systems such as Broadband and toll free network manager. Particularly, the Report Manager 250 includes and provides access to the metadata which is used to tell the Report Requestor what a standard report should look like and the "pick-list" options the user has in order for them to customize the standard report. It is additionally used to tell the Report Viewer client how to display the report, what calculations or translations need to be performed at the time of display, and what further customization options the user has while viewing the report. It additionally includes a common report view by executing a GUI applet that is used for the display and graphing of report data and particularly, is provided with spreadsheet management functionality that defines what operations can be performed on the spreadsheet including the moving of columns, column suppression, column and row single and multiple selection, import and export of spreadsheet data, printing of spreadsheet, etc. It is also provided with report data management functionality by defining what operations can be performed on the data displayed in a spreadsheet including such dynamic operations as sorting of report data, sub-totaling of report data, etc. Furthermore, the report viewer 215 is provided with functionality enabling the interpretation of Meta Data; and, functionality enabling communication with the Backplane (FIG. 3). The Report Viewer application 215 additionally accepts messages telling it to display an image or text that may be passed by one of the applications in lieu of report data (e.g., Invoice, Broadband report, etc.)

All reporting is provided through the Report Viewer interface which supports text displays, a spreadsheet, a variety of graphic and chart types, or both spreadsheet/graph simultaneously. The spreadsheet presentation allows for sorting by any arbitrary set of columns. The report viewer 215 is launched from the inbox client 210 when a report is selected.

By associating each set of report data which is downloaded via the Inbox server 270 with a "metadata" report description object, reports can be presented without report-specific presentation code. At one level, these metadata descriptions function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels.

The same metadata descriptions may be used to provide common data export and report printing services. When extended to describe aggregation levels of data within reporting dimensions, it can even be used for generic rollup/drilldown spreadsheets with "just-in-time" data access.

The metadata data type may include geographic or telecommunications-specific information, e.g., states or NPAs. The report viewer may detect these data types and provide a geographic view as one of the graph/chart types.

Figure 8:
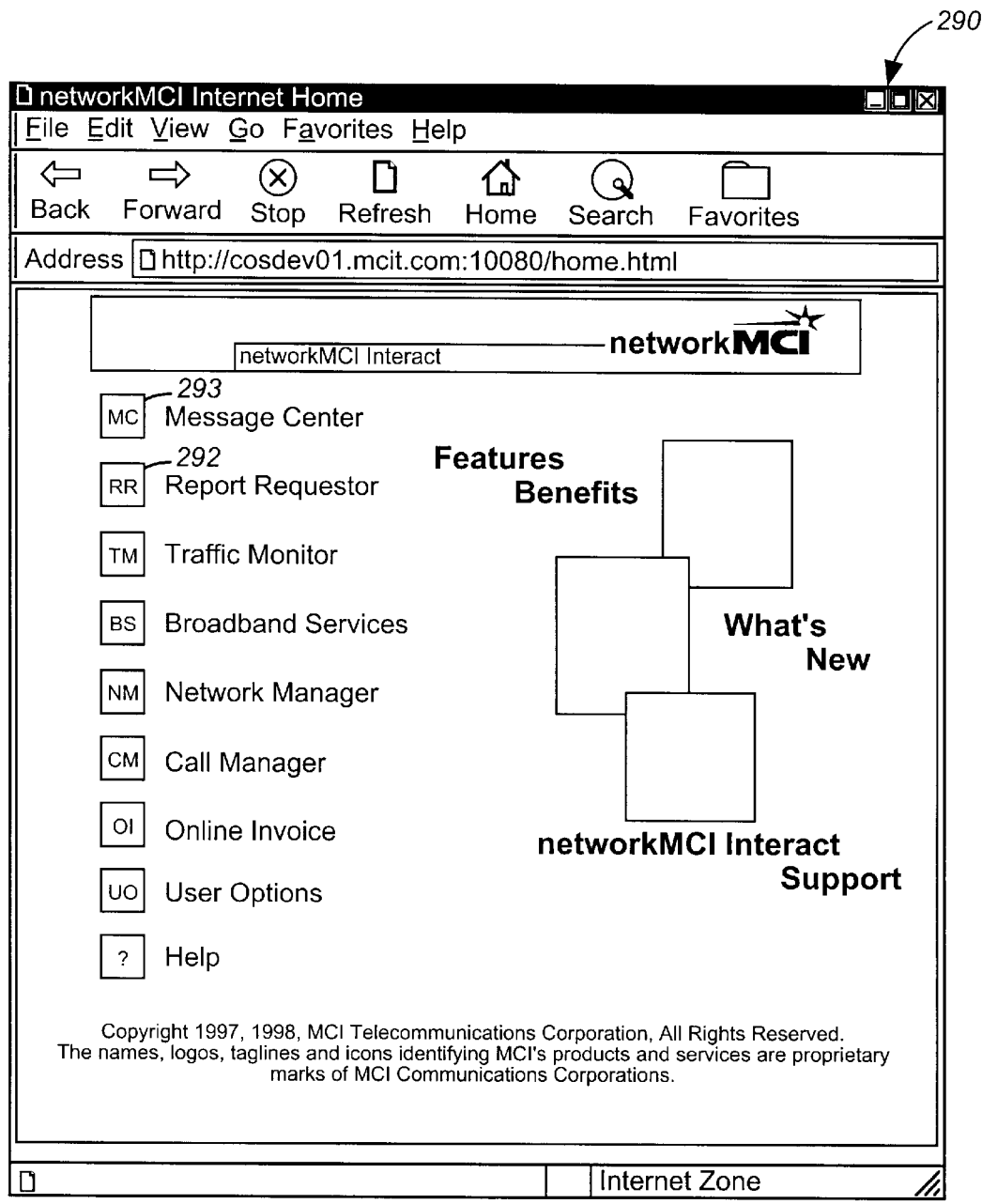
FIG. 8 illustrates an example Web/Internet-based home page screen providing general menu of customer options.

An overview of the report request/scheduling process 600 implemented by StarWRS Report Manager and Report Requestor tools will now be described herein in view of FIGS. 7(a)–7(d) as follows:

In preliminary steps, a user first establishes communication with the DMZ Web server at step 602 and logs on to the nMCI Interact system by entering the user's name and password onto a logon dialog box, as indicated at step 604. Then, at steps 606–608, an application running on the backplane directs a "Validate User Message" to the StarOE server 280 via the web server and dispatcher servers (FIG. 6) to direct the StarOE server 280 to perfornm security validation and authenticate the user ID and password in the manner as described in commonly owned, co-pending U.S. patent application Ser. No. 09/159,408, entitled AUTHENTICATION AND ENTITLEMENT OF WEB BASED DATA MANAGEMENT PROGRAMS, the contents and disclosure of which is incorporated by reference herein. It is understood that all communication to the StarOE server is via TCP/IP with a Unix process listening on a known TCP port. The StarOE server acts as a proxy when messages are sent from the Dispatcher server 26 and supports synchronous transactions. All data and security information is accessed by direct queries to a StarOE server database 283, such as provided by Informix. Once a user is logged on, the Web Server (FIG. 2(b)) requests a current list of authorized applications from the StarOE server 285 as indicated at steps 608 and 610. Particularly, as described in co-pending U.S. patent application Ser. No. 09/159,408, the contents and disclosure of which is incorporated by reference herein, a "Get User Application Request" message is communicated to the StarOE server via the backplane which queries the Informix database to obtain a list of authorized applications, i.e., services, for the user and which determines which buttons on the home page are active, thus controlling their access to products. This information is downloaded by a GUI applet that is executed via the Backplane (not shown) and incorporated into the home page that is presented to the user as indicated at steps 612–614. An exemplary home page screen display 290 is shown in FIG. 8 which provides a list of icons representing the possible options available to the user.

Referring back to FIG. 7(a), the steps 615 and 616 indicate the selection and presentation of the Report Requestor display which presents the reporting options to a user in accordance with that user's entitlements as determined at previous step 610. Specifically, upon selection of a Report Requestor icon 292 from the home page screen display 290 of FIG. 8, a StarWRS report requester web page is presented to the customer.

Appendix H provides the format and content of the nMCI Interact common objects downloaded to the Report Requestor client application to enable web-based reporting. As shown in Appendix H, the Report Requestor first asks for common objects for a user's default timezone, language and currency. The Report Requestor objects are invoked to retrieve from StarOE the various customer entitlements relating to security, geographical hierarchy, billing hierarchy, and paging and e-mail notification, as further shown in Appendix H.

Figure 9A:
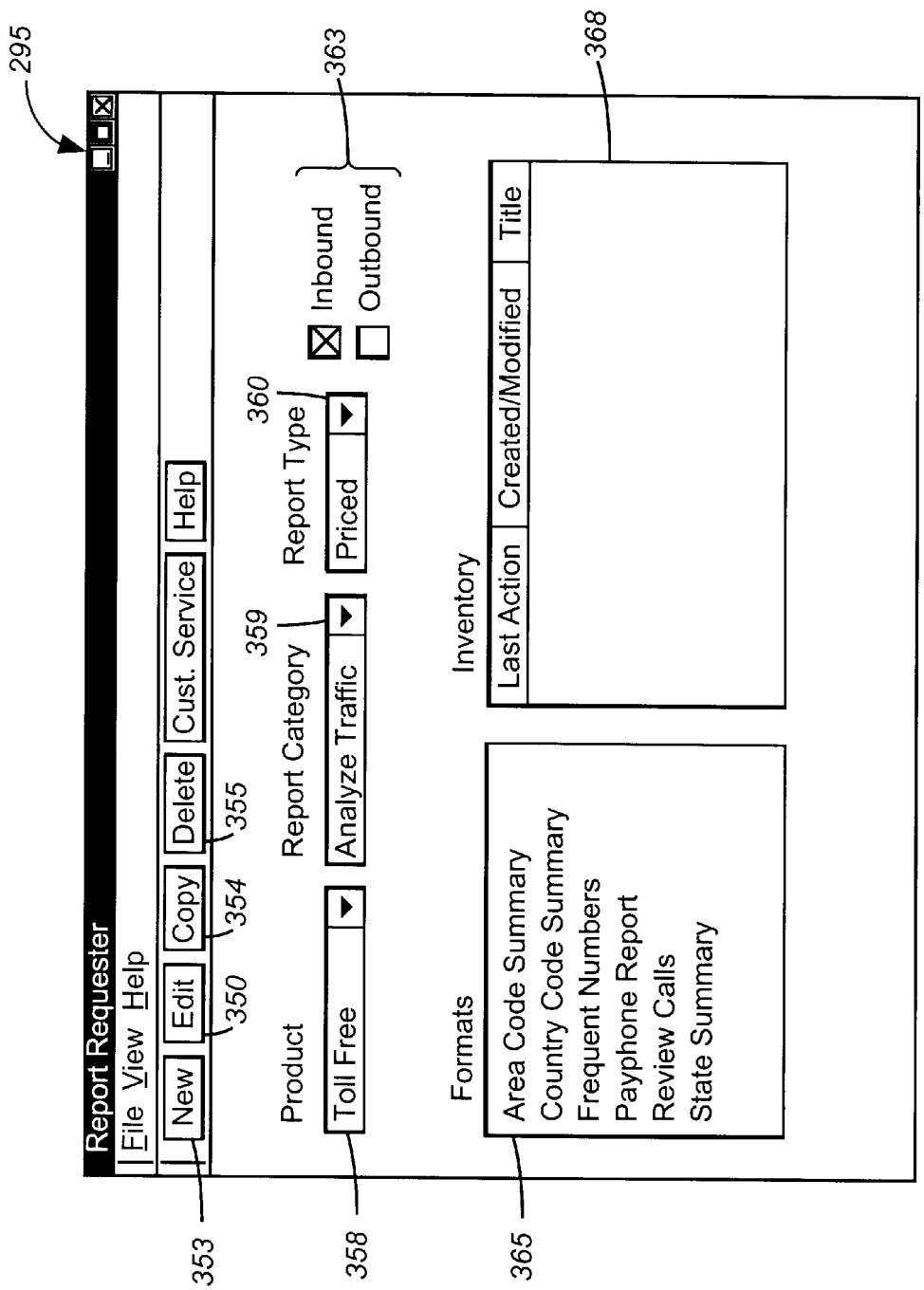
FIGS. 9(a)–9(h) illustrate various examples of report requestor screen dialogs enabling user customization of report requests.

FIG. 9(a) illustrates an exemplar dialog box 295 provided on the report requester web page that is presented to the user after the logon and authentication process. From this dialog, the user is enabled to edit an existing report maintained in the report manager inventory, by selecting "edit" button 350, generate a new report by selecting "new" button 353, copy an existing report by selecting button 354, or delete an existing report by selecting button 355. When creating a new report or editing an existing report, the user may enter the desired reporting options including: 1) the report product, as indicated by menu 358, and which includes toll-free, MCI Vision, and MCI Vnet options; 2) the report category, as indicated by menu 359, and which includes options for: analyzing traffic, call center, call detail, checking calling frequencies, financial, marketing, monitoring usage, and telecommunications categories for toll-free, Vnet and Vision customers; 3) the report type, as indicated by menu 360, and which includes priced call detail data or traffic data options; and 4) a report direction, as indicated by selection areas 363, and which includes inbound, outbound, or both directions. Referring to the flow chart of FIG. 7(b), user selection of the report product, report category, report type, and report direction, is indicated at step 620. Additionally, at step 625, the user may select the report format associated with a reporting category. For example, in the screen display of FIG. 9(a), associated with the analyze traffic report category, the report format options indicated in selection field 365 include the following: area code summary, country code summary, state summary, range summary, city summary, frequent numbers, payphone report, usage summary, calling card summary, IDAC/Supp Code Summary, Day of Week Distributions, Hourly Distribution, Call Access Summary and review calls options. For the financial report category, report formats include: longest calls, most expensive calls, Off Peak Calls, payphone report, usage summary, calling card summary, and area code summary; for marketing report category, report formats include: country code summary, state summary, frequent numbers, frequent area code summary, frequent state, and frequent cities. For the telecommunications report category, report formats include: call duration summary, IDAC/Supp Code Summary and Call Access Summary; for the call center report category, report formats include: most active toll free numbers, Hourly Distribution, Day of Week Distributions, state summary, and country code summary. For the monitor usage report category, report formats include: longest calls, most expensive calls, most active calling card and most active toll free numbers. For the check calling frequencies report category, report formats include: frequent numbers, frequent area code, frequent country codes, frequent state and frequent cities. It should be understood that enablement of any of these reporting options is based according to predefined user entitlements. That is, "Get User Security" message with a reporting application set, and a "Get User Report Security" message are sent to the StarOE server 285 via the Dispatcher server to retrieve that user's detailed security profile (entitlements) for a user that has the reporting application option. These entitlements include a list of all the report products, i.e., Vnet, Vision, Toll free, report types (priced or unpriced) and the report categories that are available for that user.

In accordance with the user report selections, if a report had already been created and maintained in the report manager database, it will be displayed in the report inventory field 368 of FIG. 9(*a*). Referring back to FIG. 7(*b*), at step 626, a determination is made as to whether an existing report from inventory is selected. If an existing report is not selected then the user is prompted to generate a new report according to customization options that the user is entitled for the selected report product, category, type, etc., as indicated at step 630. If an existing report is selected at step 626 based on the report product, category, type, etc., then the user is prompted at step 628 to select from among the following options: a report edit option, as shown at step 635; a report delete option, in which case the selected report will be deleted at steps 638 and 639; and, a report copy option, in which case an existing report will be copied, e.g., for subsequent editing, as shown at steps 640 and 641.

Whether creating a new report or editing an existing report, the user is enabled to select customization options as indicated at step 630, FIG. 7(*b*). FIG. 9(*b*) illustrates the dialog screen 296 presented to the user showing all the report customization categories for building a new report and editing an existing report. From this screen and related report building dialog boxes, all of the initial values for retrieving the MetaData, customization options and GUI builder options from the report manager server 250 necessary to build (edit) a report are provided in accordance with the user's entitlements. Thus, in view of the examplar web page shown in FIG. 9(*b*), a user may provide the following customization and report builder options as indicated in the field 370: general customization options, by selecting field 371; layout customization options, by selecting field 373; access customization options, by selecting field 375; hierarchy customization options, by selecting field 377; geographic customization options, by selecting field 378; and, notification customization options, by selecting field 379. For the following description regarding FIG. 9(*b*) it is assumed that the area code summary format had been selected, however, it should be understood that the same principles apply to any selected format.

With regard to the "general" customization options, the user is enabled to specify or change the report title, by selecting field 371*a*, report description, by selecting field 371*b*, and the report schedule, by selecting field 371*c*. For the example selection of report title customization shown in FIG. 9(*b*), the right hand field 380 will present the user with a field 381 for entering the title of the report. If an existing inventory report had been selected, then the field 380 will be display the existing title. Generally, for each of the customization screens displayed for existing reports, Report Manager will autopopulate the right hand field 380 with the existing report values.

When selecting the report schedule 371*c*, the user is presented with a screen 297, as shown in FIG. 9(*c*). The entry options for selection in the right hand field 380 includes: selection of time zone, by menu choice 382; selection of the report schedule radio buttons 383 to specify the report as recurring, daily, weekly, monthly, or hourly entry field the nature of screen; a time range for the report as specified by entry fields 384; and, a date range for the report as specified by entry fields 385. The user may also specify the report as a "one-shot" by selecting radio button 386.

Referring back to exemplar screen shown in FIG. 9(*b*), with regard to the layout customization options, the user is enabled to specify or change the number of report rows, by selecting field 373*a*, and specify or change the report columns, by selecting field 373*b*. For example, selection of report columns customization will present the user with a columns customization screen such as example screen display 298 presented as shown in FIG. 9(*d*). In FIG. 9(*d*), the right hand field 380 indicates a column tab 387, and a sorts tab, 388. The column tab enables the user to specify add or remove columns, with the selection of individual columns names provided in field 389. An example description of the column headers for an example selection of columns is shown in field 390.

Referring back to FIG. 9(*d*), selection of report sorts customization tab 388 will present the user with a sorts customization screen such as example screen display 299 presented as shown in FIG. 9(*e*). The sorts tab enables the user to specify columns to be sorted in an available sorts selection field 391, whether totals are to be made, whether the column data to be provided is in ascending or descending order, for example, as provided by selection of buttons 392, shown in FIG. 9(*e*). In the preferred embodiment, the Report Manager provides the customer with the ability to specify select columns as primary and secondary sorts. The user may specify additional secondary sorts in addition to the default sorts. For example, the user may provide the following sorts: for a Longest Call Report, a primary sort is Number of Minutes in descending order. For a Most Expensive Call Report, the primary sort is dollars in descending order. For a most Active 800# Report, a primary default sort is the Number of Calls but may be changed to Number of Minutes, or dollars, all in descending order; a Secondary sort is Toll Free Number in ascending order. For a Most Active Calling Card Report, a primary default is Number of Calls but may be changed to Number of Minutes, or dollars, all in descending order; a Secondary sort is Card Number in ascending order. For an Area Code Summary Report, the primary default sort is Area Code in descending order but may be changed to Number of Calls, Number of Minutes or dollars. For a Call Duration Summary report, the primary sort is Duration Range in ascending order. For a Country Code Summary report, the primary default sort is Country code in ascending order but may be changed to one of the following: Number of Calls, Number of Minutes, or dollars (in descending order). For the State Summary report, a primary default sort is State code in ascending order but may be changed to one of the following: Number of Calls, Number of Minutes, or dollars (in descending order). For the Frequent Numbers Report, a primary default sort is Number of Calls but may be changed to Number of Minutes, or dollars, all in descending order; a secondary sort is Number Called in ascending order. For the Frequent Area Code Report, a primary default sort is Number of Calls but may be changed to one of the following: Number of Minutes, or dollars, all in descending order, or Area Code in ascending order; a secondary sort is Area Code in ascending order. For a Frequent State Report, a primary default sort is Number of Calls but may be changed to Number of Minutes, or Dollars, all in descending order, or State Code in ascending order; a secondary sort is State in ascending order. For Frequent Cities Report, a primary default sort is Number of Calls but may be changed to Number of Minutes, or dollars, all in descending order, or City Code in ascending order; a secondary sort is City in ascending order. For a Payphone Report, sort is by 800 Number. For a Review Calls Report, a primary default is date, but may be changed to Time or Billing Hierarchy. For a Call Detail File report, a primary default is Date, but may be changed to time or billing hierarchy.

Figure 9B:
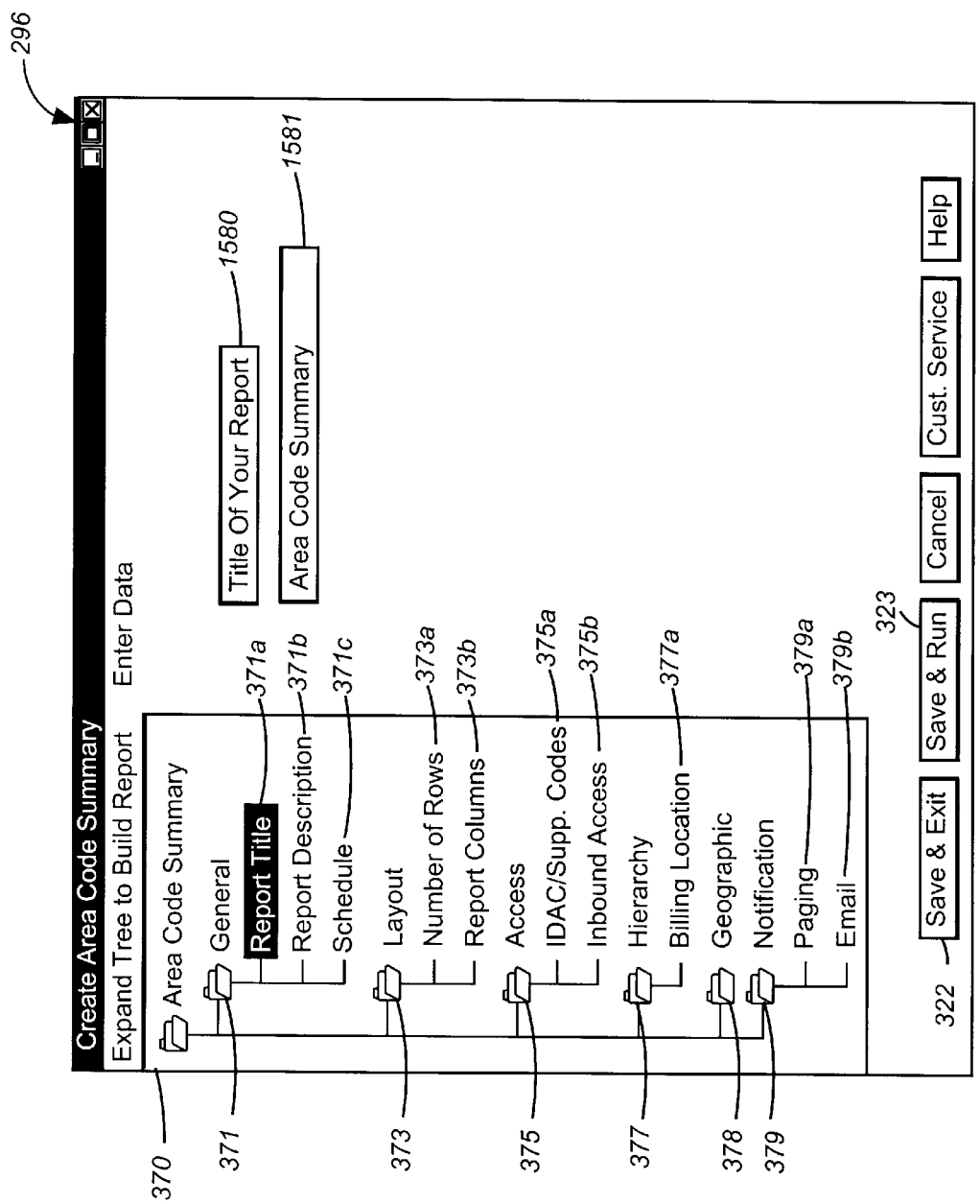
Figure 9C:
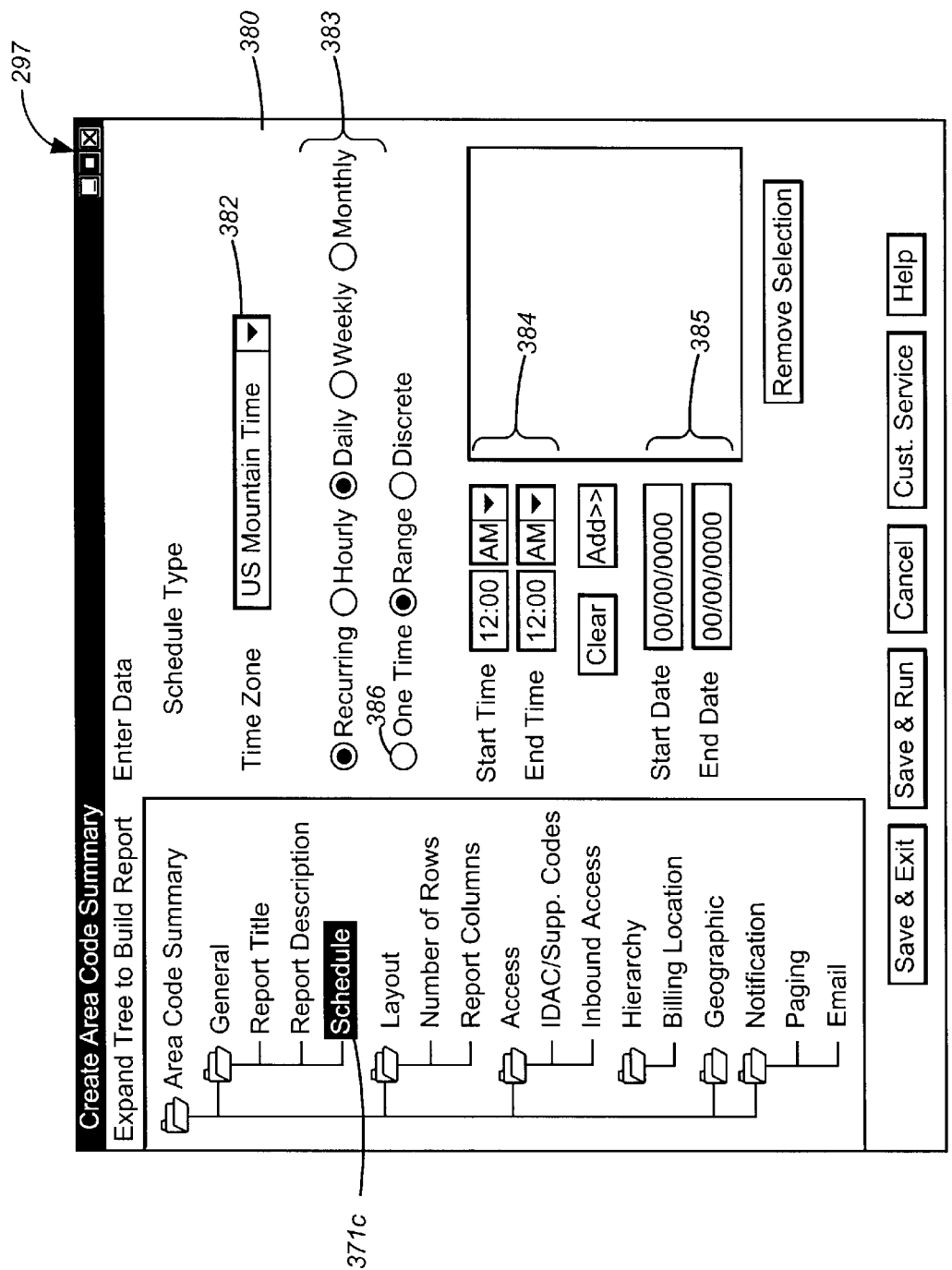
Figure 9D:
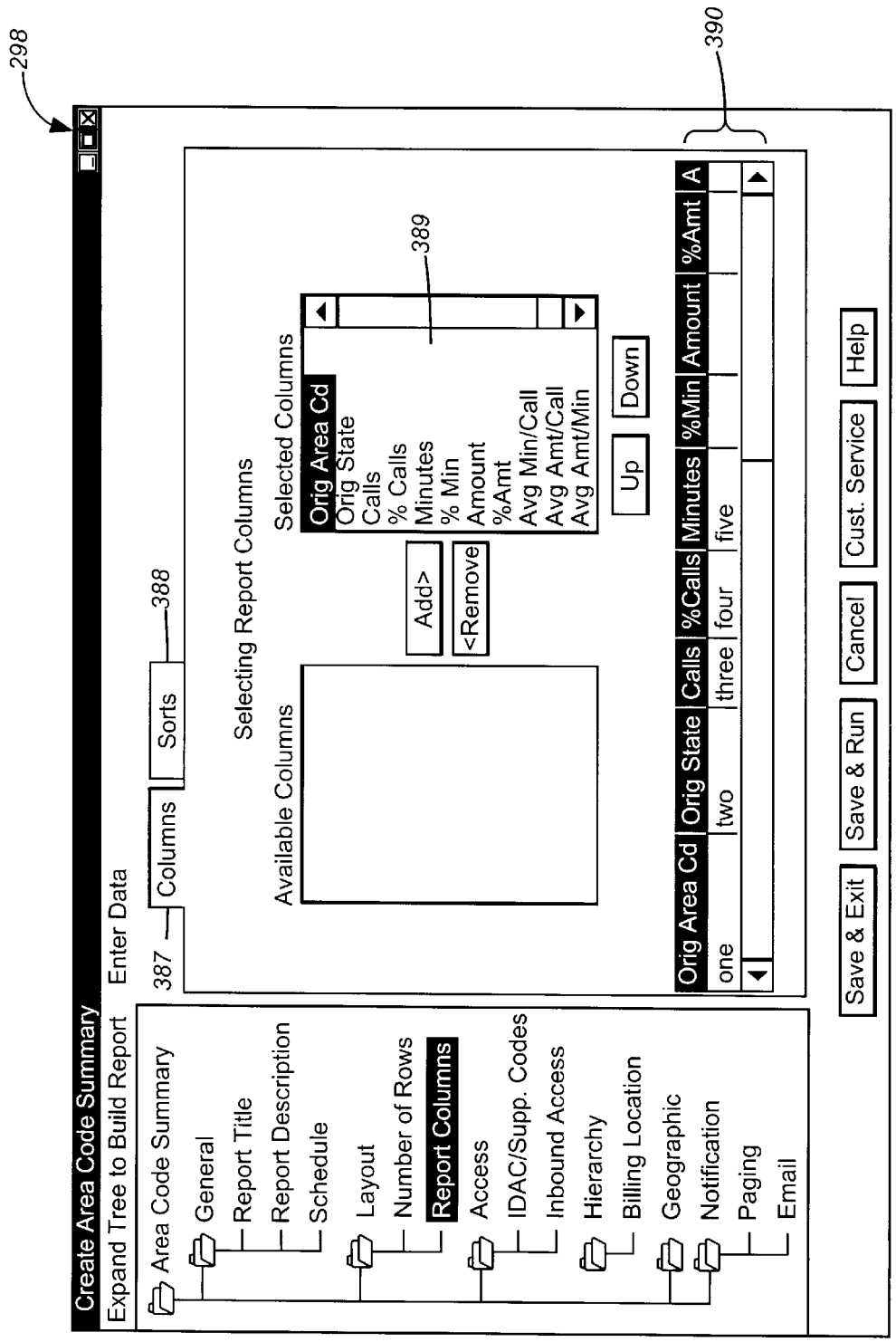
Figure 9E:
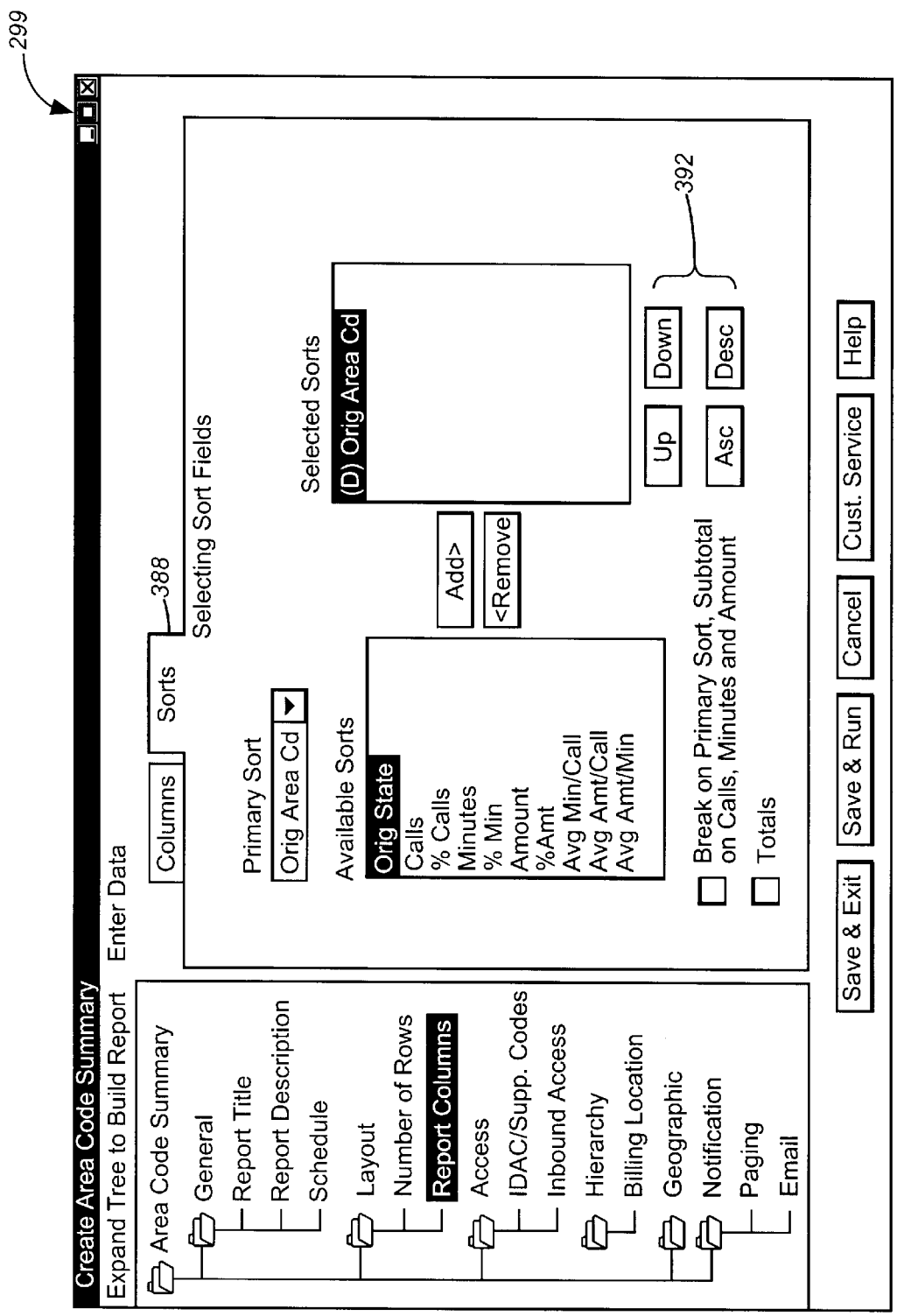
Figure 9F:
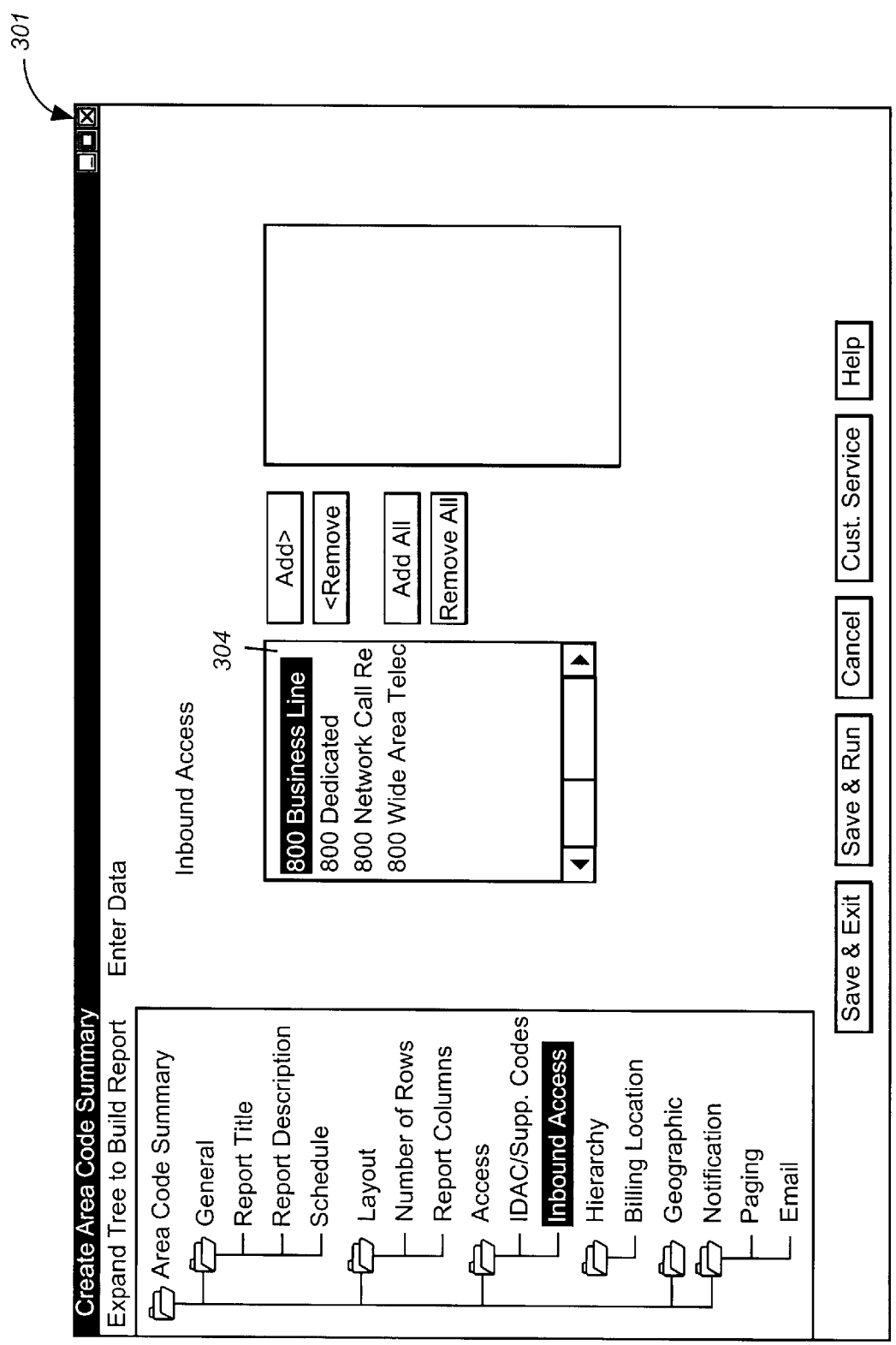

Referring back to exemplar screen shown in FIG. 9(b), with regard to the access customization options, the user is enabled to specify or change an accounting "IDAC" code or supplemental code, by selecting field 375a, and specify or change the inbound access type, by selecting field 375b. For example, selection of inbound access customization presents the user with a web page having an inbound access customization screen such as example screen display 301 presented as shown in FIG. 9(f). In FIG. 9(f), depending upon the selected report format, the right hand entry field 304 presents the user with the following selectable access types: dial 1, card, dedicated, 800 Remote Access, Direct Dial fax, store/forward fax, 800 Business line (highlighted in the FIG. 9(f)), 800 wide area telecommunications service, 800 dedicated, 800 Network Call Redirect, local, cellular.

Figure 9G:
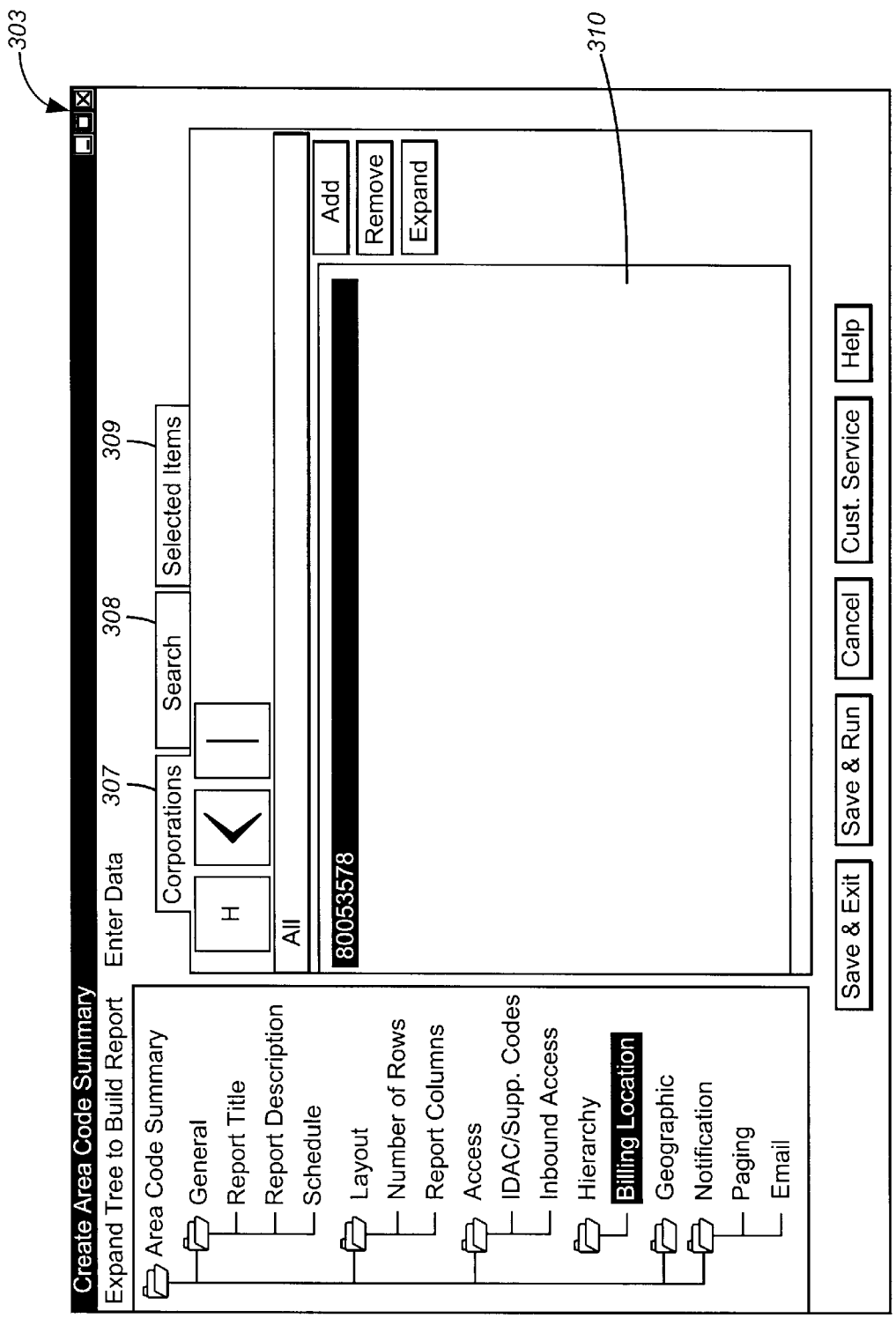

Referring back to exemplar screen shown in FIG. 9(b), with regard to the hierarchy customization options, the user is enabled to specify or change the billing location by selecting field 377a. Upon selection of the billing location customization option, the user is presented with a web page having a customization screen such as example screen display 303 presented as shown in FIG. 9(g). In FIG. 9(g), depending upon the selected report format, the right hand screen presents the user with three tabs: a corporations tab 307, a search tab, 308, and, a selected items tab 309. When selected, the corporations tab 307 enables the user to add or remove a corporate ID to/from a billing location hierarchy in the entry field 310. A search of corporate IDs may be performed by selecting the search tab 308, and items that have been selected may be displayed in a field (not shown) presented by selection of the selected items tab. Likewise, referring back to exemplar web page screen shown in FIG. 9(b), with regard to the geographic customization options, the user is enabled to specify or change the billing location by selecting field 377a. Upon selection of the billing location customization option, the user is presented with a web page having a customization screen such as example screen display 311 presented as shown in FIG. 9(h).

Figure 9H:
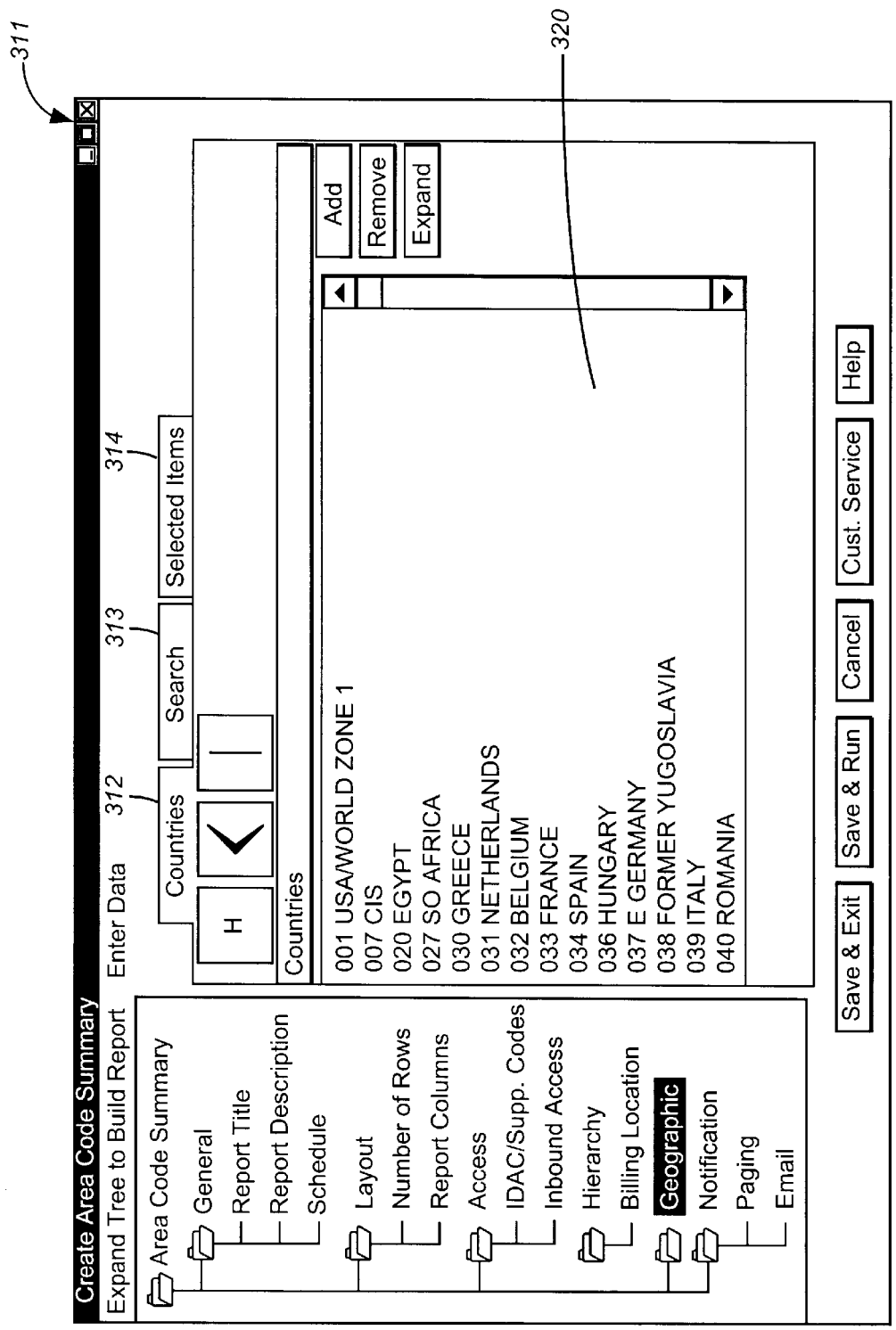

In FIG. 9(h), depending upon the selected report format, the right hand screen presents the user with three tabs: a countries tab 312, a search tab, 313, and, a selected items tab 314. When selected, the countries tab 307 enables the user to select, add or remove a country that may be a subject for reporting as provided in the entry field 320. A search of countries may be performed by selecting the search tab 313, and items that have been selected may be displayed in a field (not shown) presented by selection of the selected items tab 314.

Referring back to exemplar screen shown in FIG. 9(b), with regard to the notification customization options, the user is enabled to specify report notification by paging, by selecting field 379a, and, report notification by e-mail, by selecting field 379b. Upon selection of the paging notification option, the user is presented with a web page having a customization screen (not shown) presenting the user to select or enter that user's page number, PIN number and a paging message description. Upon selection of the e-mail notification option, the user is presented with a web page having a customization screen (not shown) presenting the user to select or enter that user's e-mail address.

As mentioned above with respect to FIG. 6, the Report Requestor client application 212 gains access to the Metadata stored at the Report Manager server 250 through messaging. Particularly, as hereinafter described, a message generated by the Report Requestor in accordance with the user request is first received by the report manager proxy 250'. In the preferred embodiment, the report manager proxy comprises a set of tools in the form of reusable objects, preferably written in C++ code, or the like. For example, a parser object tool is employed to decompose the Metadata messages sent by the report requestor 212 to validate the message. If errors are found in the Metadata input, the RM will return an error message to the requesting client. If the Metadata passes the validation tests, the request type is then determined and the appropriate service will be invoked after which a standard response is sent back to the requesting client.

The Report Manager 250 implements stored procedures to translate the message, perform the request, and send the information back to the Report Requestor 212 which uses the metadata to determine what a standard report should look like, the customization options the user has, and the types of screens that should be used for the various options (i.e., single selection, multiple selections, etc.). It is understood that the selection of available standard template reports is based on the user's entitlements.

The following list provides the types of requests that may be initiated by the Report Requestor 212 and the responses performed by the Report Manager 250: 1) Get/Send report template list (GRTL/SRTL)—which request retrieves the list of all standard report templates for all products and is used only to obtain general report information, e.g., report title, description, etc.; 2) Get/Send report template detail (GRTD/SRTD)—which request retrieves the details of a specific standard report template; 3) Get/Send user report list (GURL/SURL)—which request retrieves the list of all user reports for the report format selected from a user report table and is used only as a request for general report information, e.g., report title, status, etc.; 4) Get/Send user report detail (GURD/SURD)—which request retrieves the details of a specific user's report; 5) Add report definition/Acknowledgment (ARD/ARDA)—which requests addition of a user-created report to a user report table. If the report is a scheduled report, this request is also communicated to the fulfilling server at the time the report is due; 6) Delete report definition/Acknowledgment (DRD/DRDA)—which request deletes a user-created report from the user table; 7) Copy report definition/Acknowledgment (CRD/CRDA)—which request creates a duplication of the report the user is editing (other than the report title) and creates a new report ID for it; 8) Update Reporting Schedule/Acknowledgment (URS/URSA)—which request updates the scheduling information on a report without having to send a Delete and Add request; and, 9) Get Pick List/Acknowledgment (GPL/GPLA)—which request enables the Report Requestor 212 to get a pick list provided by StarOE server.

In a preferred embodiment, as shown in Table 1, the interface message sent to the RM server 250 from the report requestor via the Dispatcher server 24 comprises a three to four character message acronym followed by request specific parameters.

TABLE 1

| Parameter Name | Parameter Type | Required | Acceptable Value |
|---|---|---|---|
| Request | 3 or 4 Characters | Yes | Msg acronym |
| Data parms . . . | Characters | No | |

Table 2 illustrates the interface message format returned by the RM server 250.

TABLE 2

| Parameter Name | Parameter Type | Required | Acceptable Value |
|---|---|---|---|
| Response | Char (4) | Yes | Msg acronym |
| Error Code | Char (4) | Yes | 0 = OK or error |
| Data parms . . . | Char # | No | |

As shown in Table 2, the response message to be returned in Metadata format preferably includes a four character message acronym followed by an error code. A successful request (or a request acknowledgment) generates a response with an error code of "0". Additional data specific to the response follows this error code. If any server receives a message which is not known, the response message will echo the message acronym back along with an appropriate error code.

Appendix A provides a series of tables containing the content for each metadata message request that can be sent by the report requestor 212 for each of the enumerated user requests, in addition to the content of the corresponding metadata message responses by the RM server 250. As an example, when a user requests a list of all standard report templates that can be created for a specified product, category, and product type, e.g., toll free unpriced data, an example metadata format is as follows:

GRTL<PRODUCT=V,DATATYPE=C,DATACAT=U, IO=O> where GRTL is the message name, the PRODUCT indicates the product type, e.g., V=Vnet, C=CVNS, S=Vision, T=toll free, F=Traffic view, etc. DATATYPE indicates the data type, e.g. R=reports, D=call detail, etc., and DATACAT represents the report category, e.g., P=priced, U=unpriced.

In the hereinafter described manner, the GRTL message is received by the StarWRS proxy server application 250' to enable the RM server 250 to perform the query into the RM Informix database having the data associated with the request. Specifically, after selecting the Report Requester from the browser or the Toolbar, a WRSApp object is launched. At its creation, the WRSApp object creates a DataManager object to guide the data and which initiates a CommunicationManager object to manage all communication between the client and the server. The CommunicationManager utilizes a RptManagerMsg object to create: 1) a GRTL; 2) a WRSCommWrapper for direct communication with the backend; and, 3) a WRSReportManagerUtilParser to format the data returned. In response, the Report Manager creates a Dispatcher object, which contains the business logic for handling metadata messages at the back-end and utilizes the services of a RMParser class. Upon determining that the client has sent a valid message, the appropriate member function is invoked to service the request. Upon receiving the message, the Report Manager creates the Parser object (RMParser) which takes the message apart and invokes a validation object which validates the message.

In response to the GRTL message, the data returned by the Report Manager server 250 for this particular request may include the following data in metadata format as follows:

SRTL<ERROR=0, REPORTS = <RptCategoryDescription1=
<RptTitle1.1, RptTemplateID1.1, RptCategoryType1.1>,
<RptTitle1.2, RptTemplateID1.2, RptcategoryType1.2>>,
<RptcategoryDescription2 =<RptTitle2.1,
RptTemplateID2.1, RptCategoryType2.1>, <RptTitle2.2,
RptTemplateID2.2, RptCategoryType2.2>>, . . .
<RptCategoryDescription#n=<RptTitle#n.n,
RptTemplateID#n.n, RptCategoryType#n.n>, <RptTitle#n.n,
RptTemplateID#n.n, RptCategoryType#n.n>>> wherein RptID# indicates a standard report template ID, RptTitle# indicates the standard report template title, RptCategory# indicates the report category, e.g. Monitor Usage, Analysis Traffic, Historical, Executive Summary, Call Detail, etc.; and, RptDescript indicates the standard report template description displayed to the user. Thus, for each Report Template Category, there will be the list of reports with each entry containing a Report Template Title, a Report Template Description and the Report Template ID. The SRTL message is sent from the StarWRS RM proxy server to the report requester for presentation to the customer. Specifically, the SRTL response is built inside the esql wrapper function after obtaining the necessary information through the stored procedure from the Report Manager Informix database. The Report Manager creates the RMServerSocket object and sends the SRTL message back to the client.

To retrieve details of the standard report template, the GRTD request message request is sent having content shown in the table in Appendix A. When specified, the Report ID field indicates an existing report that a user may wish to edit.

The SRTD response generated by the RM server is formatted in metadata as follows:

< Report Template ID=ID#,
NODE1=<node level1, label value1, assigned unique screen
identification1, >,
NODE2=<node level2, label value2, assigned unique screen
identification2, <control ID2.1, field value2.1, data
location2.1>, <control ID2.2, field value2.2, data
location2.2>, <. ., . ., . . >>,

```
NODE#n=<node level#n, label value#n, assigned unique
  screen identification#n, <control ID#n.1, field
  value#n.1, data location#n.1>, <control ID#n.2, field
  value#n.2, data location#n.2>>
```

In the SRTD message, the MetaTreeData Label fields include such values as General, Report Name, Report Description, Scheduled Execution, etc. The MetaCtrlInfo MetaField Value fields may be blank or may contain the selection options available to the user. This information is taken from the report template database.

As another example, when a report request is submitted to retrieve a full list of user created reports from a user report table, i.e., a template list for a particular report product, category, and type, the example metadata format is as follows:

GURL<USERID=jeanvnet2,RPTTMPID=1,ENTPID= 00022924,PRODUCT=T,DATACAT=U> with UserID and ReportTemplateID fields specified. Specifically, this process entails invoking the Communication Manager object to communicate with the RM server in order to obtain a SURL metadata message. The CommunicationManager utilizes the RptManagerMsg object to create: 1) a GURL, 2) a WRSCommWrapper for direct communication with the backend, and, 3) a WRSReportManagerUtilParser to format the data returned. The parser returns a hash table containing the User Report List. At the RM server, the Report Manager creates an Dispatcher object that contains the business logic for handling metadata messages at the back-end and utilizes the services of the RMParser class. Upon determining that the client has sent a valid message, the appropriate member function is invoked to service the request. The Report Manager, upon receiving a message, creates a Parser object (RMParser) which takes the message apart and invokes a validation object which validates the message.

In response to the GURL request, the data returned is taken from a user report table in the RM server database. The generic SURL message in Metadata format returned by the RM server 250 includes the following information:

```
REPORTS = <UserRptCategory1  = <UserRptTitle1,
UserRptID1, activeflag, report type, statusdate >>,
<UserRptCategory2  = <UserRptTitle2, UserRptID2,
activeflag, report type, statusdate>>, . . .
<UserRptCategory#n  = <UserRptTitle#n, UserRptID#n,
activeflag, report type, statusdate>>>
``` wherein for each user report categroy, there is a list of reports where each entry contains a UserRptID# indicating a user-defined report template ID, a UserRptTitle# indicating the user's report template title, and a UserRptCategory# indicating the user report category. Specifically, the SURL response is built inside an esql wrapper function after obtaining the necessary information through a stored procedure from the Informix database. The Report Manager creates the RMServerSocket object and sends the SURL message back to the client.

To retrieve the details of a specific user's report, the GURD message is sent having data as contained in the table shown in Appendix A. Specifically, when the user selects a report from the Inventory List on the Report Requestor, a Communication Manager object is invoked to communicate with the RM server in order to obtain a SURD metadata message. The CommunicationManager object first utilizes the RptManagerMsg object to create: 1) a GURD metadata message, 2) a WRSCommWrapper for direct communication with the backend, and 3) the RSReportManagerUtilParser to format the data returned. The parser organizes the data into a series of nodes which are utilized to create the report builder tree on the report requestor customization screen. Later this data will be extracted from the node and used to construct the screen related to the node. The Report Manager server creates the MCIDispatcher object which contains the business logic for handling metadata messages at the back-end and utilizes the services of the RMParser class. Upon determining that the client has sent a valid message, the appropriate member function is invoked to service the request. The Report Manager, upon receiving a message, creates the Parser object (RMParser) which takes the message apart, invokes a validation object which validates the message and builds a response inside the esql wrapper function after obtaining the necessary information through the stored procedure from the Informix database. The Report Manager creates the RMServerSocket object and sends the SURD/SRTD message back to the client. The responsive SURD metadata message corresponding to a retrieve user report detail (GURD) request has the following metadata syntax:

```
<Report Template ID=ID#,
NODE1=<node level1, label value1, assigned unique screen
identification, >,
NODE2=<node level2, label value2, assigned unique screen
identification2, <control ID2.1, field value2.1, data
location2.1>, <control ID2.2, field value2.2, data
location2.2>, <. ., . ., . .>>,
NODE#n=<node level#n, label value#n, assigned unique
screen identification#n, <control ID#n.1, field
value#n.1, data location#n.1>, <control ID#n.2, field
value#n.2, data location#n.2>, <. ., . ., . .>>,
```

This response thus may include the report information having detailed items including: UserReportID (UserID), User's report name (UserName), product (UserProd), Threshold (UserThreshold), User Report Description (UserDescript), Report Columns (UserFields), Report column headings (UserHeaders), and, in addition, customization options with fields indicating, inter alia, columns to display (UserHeaders), user-defined criteria (UserCriteria), a sort order (UserOrder) and scheduling selections (UserSched), the last update of this report (UserLastUpdate) and, the Report status (if adhoc) (UserStatus), etc.

If a request is made to add a user-created report to a User_report table maintained by the RM Server 250, the ARD metadata message having fields defined in the table provided in Appendix A is processed by the RM server 250. An example message in metadata format to initiate the addition of a user-created report for TVS Inbound data is as follows:

```
ARD<USERID=jeanvnet2, ENTPID=00022924, STDRPTID=75, NAME=
Payphone Summary TVS Inbound, PRODUCT=T, CATEGORY=Standard
Report, THRESHOLD=< >,
SCHEDULE=A<START=199808010000, END=19
9808111200>, RANGETYPE=1, SCHEDTYPE=A, TIMEZONE=45,
NDIALED=
<8886520001~8886520002>, DESCRIPTION=Summarizes Payphone
Calls by Toll Free Number, ACTIVE=1,
MMADDR=jean.jerzak@mci.com, MMTEXT= Message is
```

-continued

```
in, PGT=a, PGPIN=0000000, PGTXT=654654654, EMAIL=1, PAGE=1,
LANG=1234, CURR=2345>
MMADDR=userfirst.userlast@mci.com, MMTEXT=this is a
message, PGT=1234, PGPin=1234, PGTxt=this is
another message, EMAIL=1, PAGE=1, TIMEZONE=25>
```

An example message in metadata format to initiate the addition of a user-created report for StarODS Inbound/Outbound combined priced call detail data is as follows:

```
ARD<USERID=jeanvnet2, ENTPID=00022924, STDRPTID=91, NAME=
City Summary All Tokens, PRODUCT=S, CATEGORY=Analyze
Traffic, THRESHOLD=<RECCOUNT=20>, SCHEDULE=
A<START=199806020000, END=199808152300>, RANGETYPE=1,
SCHEDTYPE=A, TIMEZONE=45,
BILLING=INBOUND<<90000003,90000003> <N
A, NA> <NA, NA>>INBOUND<<90000004,90000004> <NA,
NA> <NA, NA>>,
CARDNO=<1235468795255~45646*>, IDAC=<12345678~16*~888*~87
8979879879987>, GEO=GEO<<001, 001 USA/WORLD
ZONE1> <NA, NA> <NA, NA> <NA, NA> <NA, NA>>,
ACCESS=<7~9~10~8>,
OACCESS=<4~2~12~3~1>, IDISTRANGE=<0~2~1>,
ODISTRANGE=<A~B~C>,
IUSAGE=<3~1~5~2>, OUSAGE=<3~1~2>, SORTBY=<47D>,
DESCRIPTION=This report summarizes call detail by the
originating city and state (USA) / province (CA) for
inbound and the terminating city and state (USA) /
Province (CA) for outbound calls. , COLUMNS=<47~49~72~84~
89~62~85~59~61~87~88~37~63~64~66~65>, ACTIVE=1,
TOTALMODE=0, MMADDR=jean.jerzak@mci.com,
MMTEXT=here is a message,
PGT=a, PGPIN=0000000, PGTXT=5465465465, EMAIL=1, PAG
E=1, LANG=1234, CURR=2345>
```

In this example, the "NAME" field refers to the Report Name (e.g., city summary); the "PRODUCT" field refers to the report product (Vision); the "THRESHOLD" field refers to the record count; the "DESCRIPTION" field refers to the report description; the "COLUMNS" refers to the number of columns specified for a report by the user; the "BILLING" field refers to the specified report billing entitlement, i.e., billing hierarchy, the "IDAC" refers to the specified accounting code; the "GEO" field pertains to the geographic area which is being reported, i.e., geographical hierarchy; the "IACCESS" field refers to the inbound access type and the "OACCESS" refers to the outbound access; the "SORTBY" field indicates the report column sorting customization with "A" indicating column(s) having data to be sorted in ascending order and, "D" indicating column(s) having data to be sorted in descending order; the "SCHEDULE" field referring to the scheduling type, e.g., with "A" indicating an ad-hoc report, and the user specified date range on which to report as indicated by the "START" and "END" fields, and additionally, the scheduling frequency information in the case of a recurring report; the SUBTOTALCOLUMNS field, referring to the report columns having data to be subtotaled; and, the "EMAIL" and "PAGE" fields indicating reporting notification via e-mail or paging, respectively.

Furthermore, for each of the metadata messages in Appendix A, including the Delete Report Definition (DRD), copy report definition (CRD), and update report scheduling (URS) messages, the report manager server 250 responds to the Report Requestor with the processing results. In the case of a copy report, a new User Report ID is assigned and returned by RM. When editing an existing report, e.g., a TVS (traffic) or StarODS (priced call data) report, the user may make changes to the Report Title, the Report Description, the Report scheduling, the 800 numbers and thresholds. For StarODS priced call data reports, customers may provide additional customization options including: number of rows, report columns, access codes, access types, billing location, geographic location, paging notification, and e-mail notification. More specifically, when the user selects a report from the inventory list (FIG. 9(*a*)) or a new report, an WRSEdit Screen is launched to provide the editing capabilities which are available for the report format. WRSedit guides the screens through the process of retrieving the screens' data. Some of the screens need data which has not yet been retrieved, such as 800 numbers or geographic locations. These screens manage the requests to the DataManager object to create the get pick list (GPL) message (Appendix A), which launches the Communication-Manager object to perform this task. The Communication-Manager utilizes the RptManagerMsg object to create the GPL, the WRSCommWrapper for direct communication with the backend, and the WRSReportManagerUtilParser to format the data returned. In response, the Report Manager server creates the MCIDispatcher object and invokes the MCIRMParser class. Upon determining that the client has sent a valid message, the appropriate member function is invoked to service the request. The Report Manager, upon receiving a message, creates the Parser object (RMParser) which takes the message apart and a validation object is invoked which validates the message. The response is built inside the esql wrapper function after obtaining the necessary information through the stored procedure from the Informix database. The Report Manager creates the RMServerSocket object and sends the GPLA message back to the client.

Having described the functionality of selecting and/or generating a report and customizing it, reference is now had to FIG. 7(*c*) which describes the next step 650 of presenting the user with report run and save options. Particularly, in the preferred embodiment, as shown in each of the customization screens (FIGS. 9(*b*)–9(*h*)), the user may select a save and exit option, depicted in FIG. 9(*b*) as button 322 or a save and run option, depicted in FIG. 9(*b*) as button 323. In either scenario, an WRSEdit object enables a WRSScnMgr object to save the report to the RM server. The WRSScnMgr object launches each screens save method which communicates with the DataManager object to place the screens data in its corresponding WRSNode. Once all of the WRSNode objects have been updated, the WRSScnMgr object calls the DataManager object's SaveReport method to build a hash table to contain all of the report's data. The CommunicationManager utilizes the RptManagerMsg object to create the ARD metadata message from the hash table, the WRSCommWrapper for direct communication with the backend, and the WRSReportManagerUtilParser to handle any errors thrown by the server. The Report Manager creates the Dispatcher object, and utilizes the services of the RMParser class and validation objects. Upon determining that the client has sent a valid message, the appropriate member function is invoked to service the request. The response is built inside the esql wrapper function after obtaining the necessary information through the stored procedure from the RM database. The Report Manager creates the RMServer-Socket object and sends the ARDA message back to the client. When a report is submitted the selected report type and reporting criteria are sent to the Report Manager.

As illustrated in FIG. 7(*c*), at step 655, in reference to user selection of a Save and Run report option, the report is marked as scheduled and saved in a user_table in the Report Scheduler server 260 via the report Manager. Subsequently, as indicated at step 660, the Report Scheduler server 260 sends the ARD message to the fulfilling server which queues the report and runs the report at the specified time(s), as indicated at step 665.

The process for generating a report for StarODS priced call detail data is described in detail in aforementioned co-pending U.S. patent application Ser. No. 09/159,684, and, for TVS unpriced call detail data, in aforementioned co-pending U.S. patent application Ser. No. 09/159,404. Generally, whether the report is to be currently run for immediate ad hoc reporting, or, is scheduled for normal scheduled reporting, the following sequence of operations, as indicated at steps 670–695, FIGS. 7(c)–7(d), are performed: First, in response to receipt of the ARD message, e.g., submitted to the fulfilling server by the Report Scheduler, the fulfilling server completes the report and compresses the report/data, as indicated at step 670. Then, the report/data is "pushed", implementing FTP, to the fulfilling server's directory on the Inbox server 270, as indicated at step 673. Each application server, e.g., TVS server 500, is responsible for generating unique file names within their directory on the Inbox server 270. For example, the following directory and file naming conventions used for re ports generated by the TrafficView server are labeled inbox-filestvs with text files having the suffix *.txt or *.txt_zip (compressed), and comma separated files having a suffix *.csv or *.csv_zip (compressed). The fulfilling server then verifies that the FTP process was successfil, as indicated at step 676, and, at step 679, a notification is sent by the fulfilling server to the Report Manager to notify the Report Manager server 250 of the location of a scheduled report. This is accomplished by using a "NRL" metadata message.

Appendix B provides a table comprising the Notify Report Location parameters used for the NRL Metadata messaging sent by a fulfilling server to the RM Server 250 when a requested report is complete. An example NRL message sent from the TVS server 500 to the RM server 250 is as follows:

```
NRL<TYPE=traffic, ENTPID=00022924, USERID=jeanvnet2,
STDRPTID=25, USERRPTID=699, REQUESTID=32185,
COMPRESS=0,
LOC=/inbox/files/testTVS/902507996STDRPTID25.CSV,
FSIZE=198369, REPORT TITLE=Simulated Report Title,
PRESORTED=1, CATEGORY=R>
```

Also provided in Appendix B is the acknowledgment table sent back to the fulfilling server in response.

In the preferred embodiment, the NRL message received by the RM server 250 includes parameters verifying whether or not the FTP process was successful. If it was successful, then the fulfilling server messages the Inbox that the file has been transmitted successfully by transmitting the report name (filename) and location. When the fulfilling server encounters a problem executing a report, a notification is sent to the Report Manager. Particularly, an error flag is placed in the status field of the User_report by the Report Manager which is displayed to the user during Report Request. The error message description will be placed in a text file and FTP'd to the fulfilling server's report location on the Inbox server (e.g., \inbox\files\tvs) by the fulfilling server.

Referring to FIG. 7(d), step 679, once the RM server 250 has received the NRL message from the fulfilling server, it verifies the file's presence, as indicated at step 682. The RM server 250 then builds a metadata file, e.g., by compressing the appropriate metadata (for displaying the report) into a .MTD file, as indicated at step 685. This .MTD file is utilized by the Report Viewer to know how to display the report. The Report Manager server creates a file including the metadata using the same file name as the report/data file, but having the following suffix: *.mtd or *.mtd_zip indicating a metadata or compressed metadata file, respectively.

Appendix F details the parameters that are passed in the GET METADATA messaging for indicating to the Report Viewer how to display a requested report. For example, a GET METADATA message corresponding to an unpriced TVS fulfilling server report is as follows:

```
<METADATA=<CRITERIA=<Name=UsageSummary292^ADescription=
This report summarizes calls based on call type. ^A
Report_Level=<INBOUND<<90000001,90000001> <NA, NA> <NA, NA>>
INBOUND<<90000002, 90000002> <, > <, >>>^AOptions=^AScheduling
_Information=^AOne_Time=^ADates=<06/01/199800:00/~07/01/1
99800:00,>^ATimezone=EST, Lang=1234, Curr=2345>DEFAULT_GRAP
H_MODE=0^ADEFAULT_GRAPH_TYPE=0^ADEFINE_X_AXIS=0
^AX_AXIS_COLUMN= ^ADEFAUL T_Y_COLUMNS=<>^A
COLUMN_DISPLAY_ORDER=<105^AT114^A67^A62^A36^A61^A58^A63^A6
4^A66^A65>^ASORT_ALLOWED=1^APRESORTED=0^A
PRESUBTOTALED=1^ATOTALMODE=0^ASORT_COLUMN S=<105A>^A
SUBTOTAL_COLUMNS=<>^ASELECTED_SECTION=0^A
METACOLUMN=<META_COLUMN_ID=105^A
COLUMN_LABEL=Usage Description^ADATATYPE=S^ADECIMAL=0^A
HIDEABLE=1^AGRAPHABLE=0^AWIDTH=20^ACALCULATE=0^A
CALCULATE_EXPRESSION=>^AMETACOLUMN=<META_COLUMN_ID=114^A
COLUMN_LABEL=Range/DistanceDescription^ADATATYPE=S^ADECIM
AL=0^AHIDEABLE=1^AGRAPHABLE=0^AWIDTH=20^ACALCULATE=0^A
CALCULATE_EXPRESSION=>^AMETACOLUMN=<META_COLUMN_ID=67^A
COLUMN_LABEL=Calls^ADATATYPE=I^ADECIMAL=0^AHIDEABLE=1^A
GRAPHABLE=1^AWIDTH=7^ACALCULATE=0^ACALCULATE_EXPRESSION=>
^AMETACOLUMN=<META_COLUMN_ID=62^ACOLUMN_LABEL=% Calls^A
DATATYPE=N^ADECIMAL=1^AHIDEABLE=1^AGRAPHABLE=1^AWIDTH=7^A
CALCULATE=0^ACALCULATE_EXPRESSION=>^A
METACOLUMN=<META_COLUMN_ID=36^ACOLUMN_LABEL=Minutes^A
```

-continued

```
DATATYPE=N^ADECIMAL=1^AHIDEABLE=1^AGRAPHABLE=1^AWIDTH=8^A
CALCULATE=0^ACALCULATE_EXPRESSION=>^A
METACOLUMN=<META_COLUMN_ID=61^ACOLUMN_LABEL=% Min^A
DATATYPE=N^ADECIMAL=1^AHIDEABLE=1^AGRAPHABLE=1^A
WIDTH=5^ACALCULATE=0^ACALCULATE_EXPRESSION=>^A
METACOLUMN=<META_COLUMN_ID=58^ACOLUMN_LABEL=Amount^ADATAT
YPE=C^ADECIMAL=2^AHIDEABLE=1^A
GRAPHABLE=1^AWIDTH=7^ACALCULATE=0^ACALCULATE_EXPRESSION=>
 ^AMETACOLUMN=<META_COLUMN_ID=63^ACOLUMN_LABEL=% Amt^A
DATATYPE=N^ADECIMAL=1^AHIDEABLE=1^AGRAPHABLE=1^AWIDTH=5^A
CALCULATE=0^ACALCULATE_EXPRESSION=>^A
METACOLUMN=<META_COLUMN_ID=64^ACOLUMN_LABEL=Avg Min/Call
 ^ADATATYPE=N^ADECIMAL=2^AHIDEABLE=1^AGRAPHABLE=1^A
WIDTH=12^ACALCULATE=0^ACALCULATE_EXPRESSION=>^A
METACOLUMN=<META_COLUMN_ID=66^ACOLUMN_LABEL=Avg
Amt/Call^A
DATATYPE=N^ADECIMAL=2^AHIDEABLE=1^AGRAPHABLE=1^AWIDTH=12
 ^A CALCULATE=0^ACALCULATE_EXPRESSION=>^A
METACOLUMN=<META_COLUMN_ID=65^ACOLUMN_LABEL=Avg Amt/Min^A
DATATYPE=N^ADECIMAL=2^AHIDEABLE=1^AGRAPHABLE=1^A
WIDTH=11^ACALCULATE=0^ACALCULATE_EXPRESSION=>>>
*<METADATA= <CRITERIA= <Name=My Report, Total=Totals
are located at the bottom of the report.,
Description=My report description,
Number_Dialed=<800#1, 800#2, 800#n>,
Scheduling_Information= Recurring, Dates= Monthly>>
DEFAULT_GRAPH_MODE=1, DEFAULT_GRAPH_TYPE=1,
DEFINE_X_AXIS=1, X_AXIS_COLUMN=2,
DEFAULT_Y_COLUMNS=<5, 6>,
COLUMN_DISPLAY_ORDER=<1, 2, 3, 4, 5, 6>,
COLUMN_STORED_ORDER=<4, 3, 2, 5, 6, 1>, SORT_ALLOWED=1,
PRESORTED = 1, TOTALMODE=3, SUBTOTCOL=<5, 6>, SELECTED
SECTION=1, METACOLUMN=<META_COLUMN_ID=1,
COLUMN_LABEL=name, DATATYPE=S, DECIMAL=0, HIDEABLE=1,
GRAPHABLE=0, WIDTH=10, CALCULATE=1,
CALCULATE_EXPRESSION=<4 / 7>>>>
```

Once the metadata file corresponding to the requested report is build by the Report Manager, the RM ftp's the .MTD file to the Inbox server, as indicated at step 688, FIG. 7(*d*). The RM server additionally updates the User report table status field with a status "C" indicating completion, as indicated at step 691.

Once the Report Manager has updated the status field, the RM server 250 then adds the report to the user's Inbox, as indicated at step 693.

Appendix C provides a table showing the fields for the metadata messaging between the RM server 250 and the Inbox server 270 for adding an item into the StarWRS system Inbox server 270, and the respective acknowledgment message format back from the Inbox server. In the "A" message found in Appendix C, the "LOC" field includes information about where the report data is located. For example, a metadata message indicating to the Inbox server that an unpriced TVS fulfilling server report is available is shown as:

```
A<CATEGORY=R, TYPE=traffic, REQUESTID=32197, USERID=
LynneLevy2, RPTID=150, PRIORITY=, COMPRESS=0, UNOTIFY=
0, MMADDR=, MMTEXT=, PGT=, PGPIN=, PGTXT=,
RPTCATEGORY=Service Location & Hour,
LOC=/inbox/files/testTVS/902512294STDRPTID10.CSV,
ENTPID=10324488, RQSTDT=1998-01-02
15:18, FSIZE=3705, RPTTITLE=Summary by Service
Location and Hour, MSIZE=3322>
```

Figure 10A:
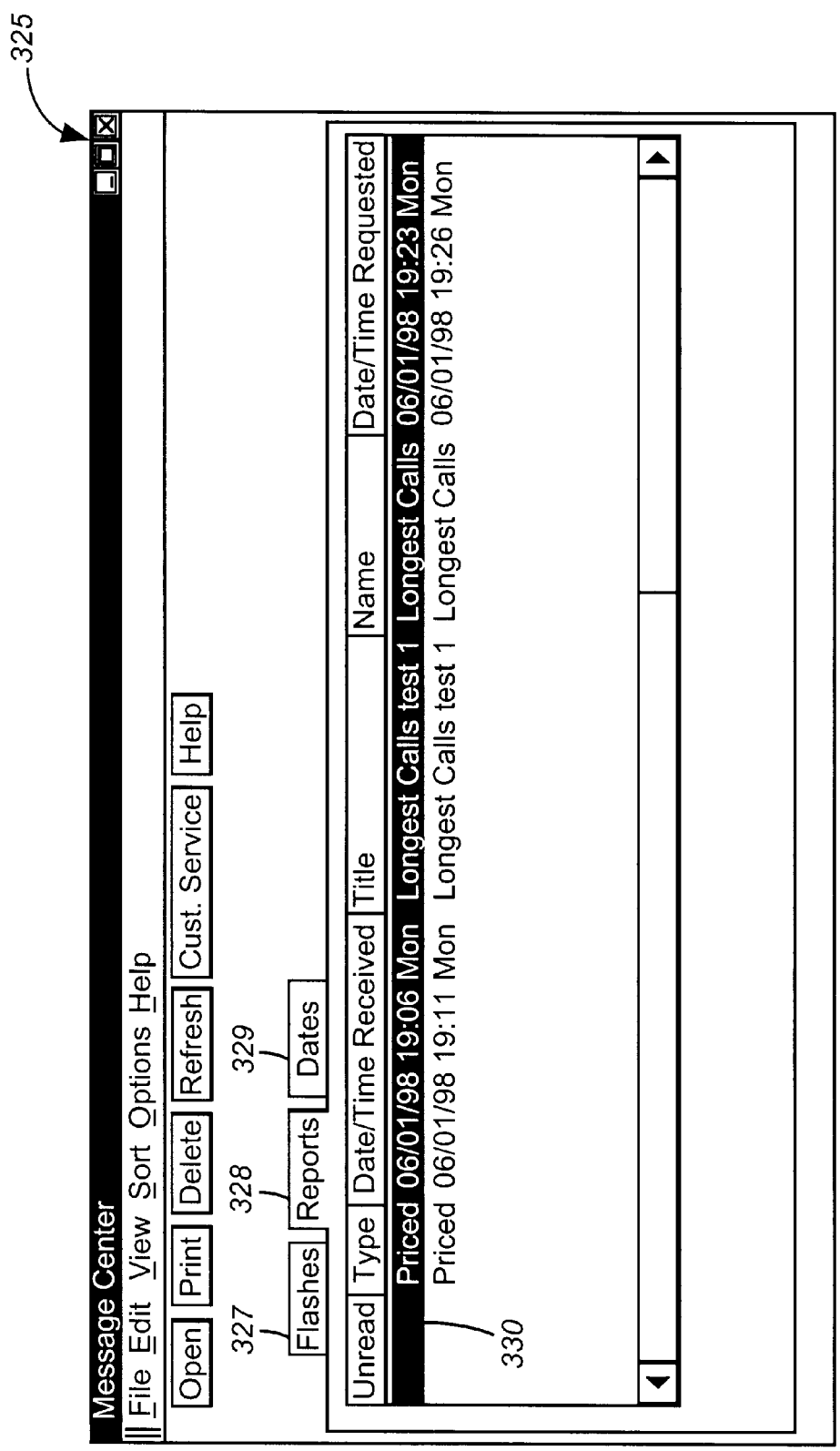
FIG. 10(a) illustrates an example browser based message center screen dialog.
Figure 10B:
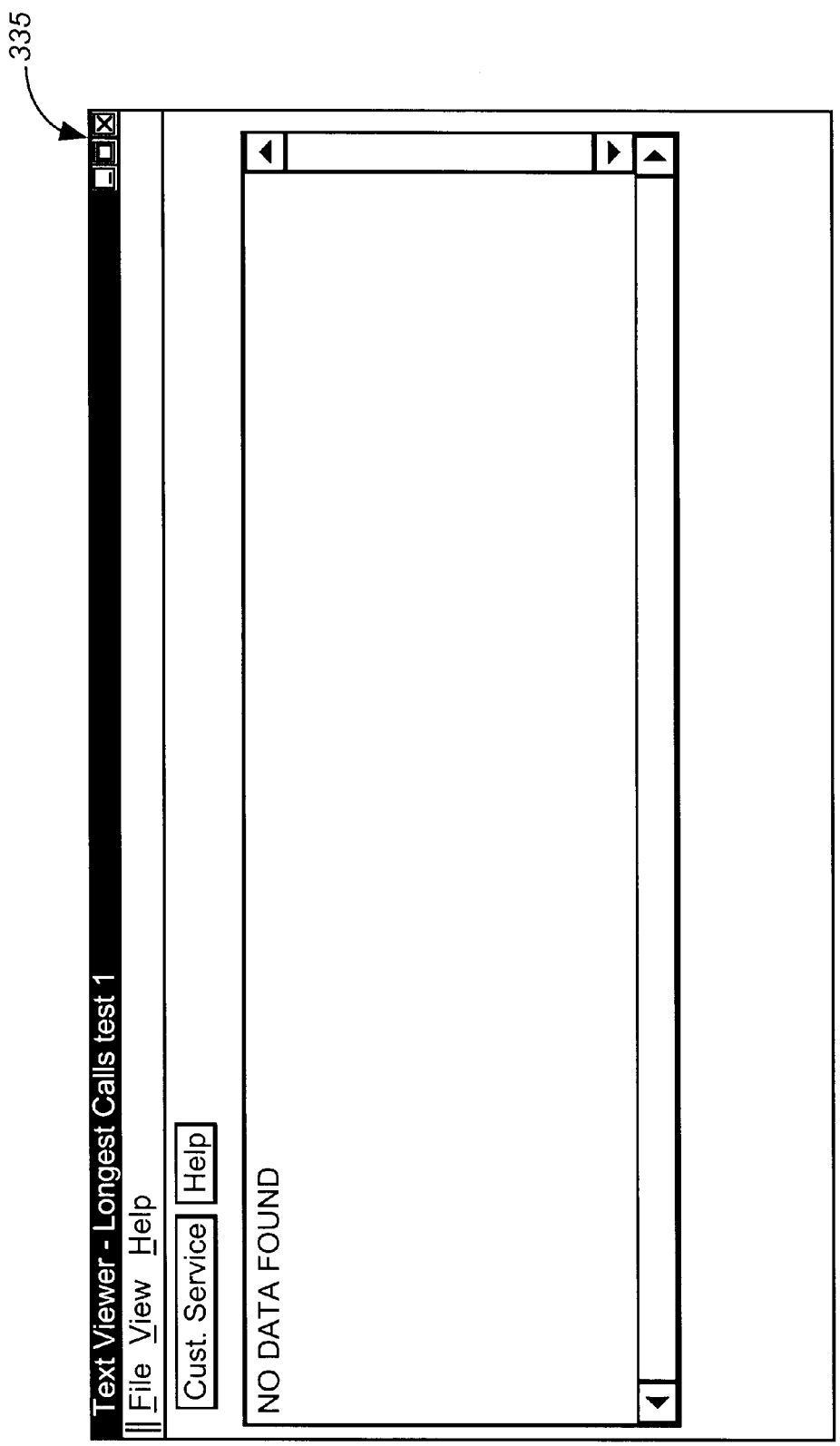
FIG. 10(b) illustrates an example report viewer dialog box used for requesting view of available generated reports.

Particularly, the RM server supplies a metadata "A" message to the Inbox indicating the FTP file location. Via the report viewer, the report is now available for viewing, downloading, saving, or printing by the user, as indicated at step 695, and as described in further detail in co-pending U.S. patent application Ser. No. 09/159,512, entitled MULTI-THREADED WEB BASED IN-BOX FOR REPORT MANAGEMENT, the contents and disclosure of which are incorporated by reference as if fully set forth herein. Particularly, as shown in the exemplary nMCI home page in FIG. 8, the nMCI Interact Message Center icon 293 may be selected which will cause the display of a web page including the message center dialog box 325 such as shown in FIG. 10(*a*). From the dialog box 325, a user may select from among three tabs, a news tab 327, a reports tab 328 and a data tab 329. Selection.of the reports tab 329 enables the retrieval of both a data file and a metadata file from the Inbox Server corresponding to those reports that have been run and available for customer viewing. Information provided for display by the message center display 325 is provided by the User_table which keeps track of the status of all reports for a particular user. Particularly, by double-clicking a chosen report, a report viewer application is enabled to display the chosen report on a web-page. FIG. 10(*b*) illustrates an example web-page presenting a text viewer screen 335 enabled by selecting the highlighted report 330 in FIG. 10(*a*). Referring back to FIG. 6, the Report Viewer 215 interfaces with the user's Inbox 210 for presenting to the customer the various type of reports received at the Inbox. It should be understood that all Report Requestor and Report Viewer applications communicate with the RM server 250 through the use of the common object communication classes.

Particularly, as shown in FIG. 6, the Inbox server 270 interface with the Inbox Client 210 supports messaging that enables the User to remove an item from the Inbox, e.g., delete a report, or, to delete all items from the Inbox, e.g., for a particular Enterprise and User ID as well as other associated reports.

Appendix G illustrates the parameters used in the metadata messaging between the Inbox client and the Inbox server. Particularly, the List "L" message is a synchronous request for a list of all Inbox items for a specific user. The Inbox fetch "F" function is a bulk transfer request that enables bulk transfer of the requested file to the Inbox client.

Referring back to FIG. 7(b), after editing or modifying an existing report, the user may simply select to save the report and exit. In this case, the ARD message is sent from the Report Requestor client to the RM server and is saved in the RM inventory database for subsequent execution. Consequently, the report is flagged as incomplete in the User_table and may not be run until a run option for that report is chosen. Otherwise, the report may be immediately scheduled if the user selects the save and run button.

As described, Metadata messaging is used throughout the various components of the StarWRS system 200. The format of an interface message that is sent to the Report Scheduler server is identical to the format as shown in Table 1 as is the interface messaging format returned by the RS server 260 in Table 2. Thus, in the case of automatic recurring reports, a variation of the process outlined in FIG. 7(c) occurs at step 660, whereby the ARD request is instead sent from the report scheduler to the fulfilling server at the programmed frequency. Particularly, when a report is required to be run, the Report scheduler server 260 (FIG. 6) sends an ARD request to the fulfilling server in a metadata message format having parameters as included in the Add Report Definition table in Appendix D. Upon processing of the metadata message, the fulfilling server will respond to the report Scheduler with an acknowledgment of the command, and the process outlined in FIGS. 7(c) and 7(d) is executed.

The Report Scheduler server 260 is additionally capable of updating the User report status table and, preferably, is provided with a tracking mechanism for tracking the scheduling of user reports. If the report is an Adhoc report, it is marked as inactive in the user report table once the status is complete.

Figure 11A:
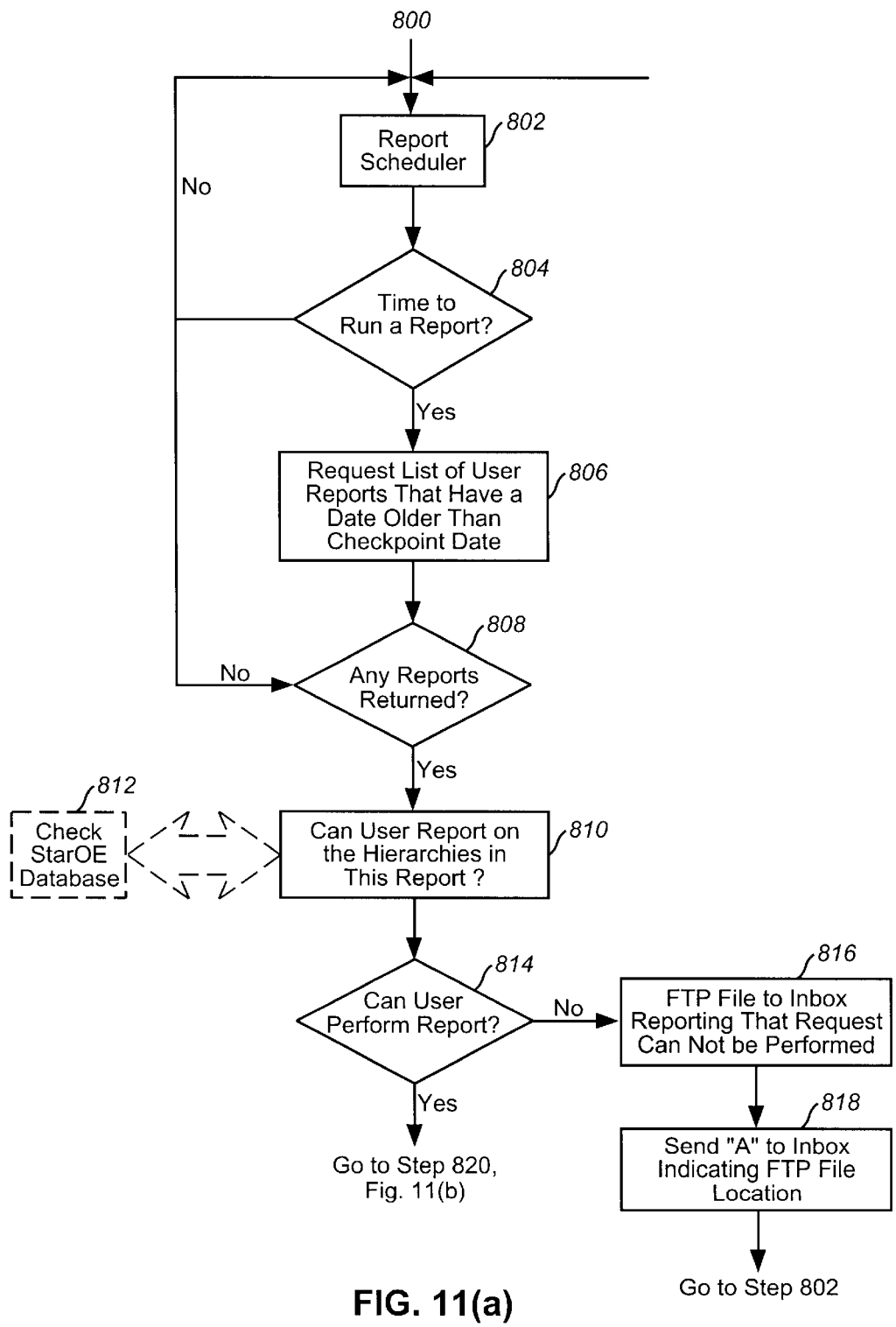
FIGS. 11(a)–11(b) illustrate flow diagrams depicting the perpetually running, report request running/scheduling process 600.

FIG. 11(a) illustrates a flow diagram depicting the Report Scheduler process 800 employed for executing scheduled reports as listed in a User_table maintained by the Report Manager and Report Scheduler servers. Preferably, each of these steps are accomplished by invoking stored procedures within the report scheduler Informix database. As shown in FIG. 11(a), the first step 802 is for determining a check point value, which is a specified time used as an index for selecting the reports to be run from the User_report table. Then, at step 804, a determination is made to determine if it is time to run a type of report, e.g., adhoc, hourly, daily, weekly, monthly. If no report needs to be run in the current loop, then the process returns to step 802. If at step 804 it is determined that a report is to be run, then at step 806, a list of user reports that have a date older than the checkpoint date is requested. This list is accessed from the User_report table maintained in the report scheduler Informix database. Then, at step 808, a determination is made as to whether any reports were returned in the request. If no reports were returned, then the process returns back to step 802. If there are reports returned, then at step 810, a determination is made as to whether the customer can still report on the "hierarchies" in the particular report.

Particularly, before the report request is submitted to the fulfilling server, the Report Scheduler server verifies the user access to hierarchy nodes, which verification is done via a direct connection with the StarOE Informix database tables, as indicated at step 812 shown as broken lines in FIG. 11(a).

Appendix I provides a list of the stored procedures called by the Report Scheduler process used to validate a user's security level, i.e., node, corp id, service location. If the StarOE returns false, the hierarchy table is updated accordingly. Particularly, the Report Scheduler server 260 validates the user's hierarchy requests with StarOE prior to sending the ARD to the fulfilling server (e.g., ODS). Any hierarchies that are no longer valid for the user are removed from the ARD and placed in a Hierarchy Notification report (not shown), which is added to the user's inbox.

After determining whether the user can report on the "hierarchies," then, at step 814, a determination is made as to whether the user can perform the report. If the user can not perform this report, e.g., due to a hierarchy conflict, then the report file is FTP'd to the Inbox server reporting that the request can not be performed, as indicated at step 816, and, at step 818, a metadata "A" message is sent to the Inbox from the RS server 260 indicating the FTP file location. Afterward, the process returns to step 802 and the process repeats.

Figure 11B:
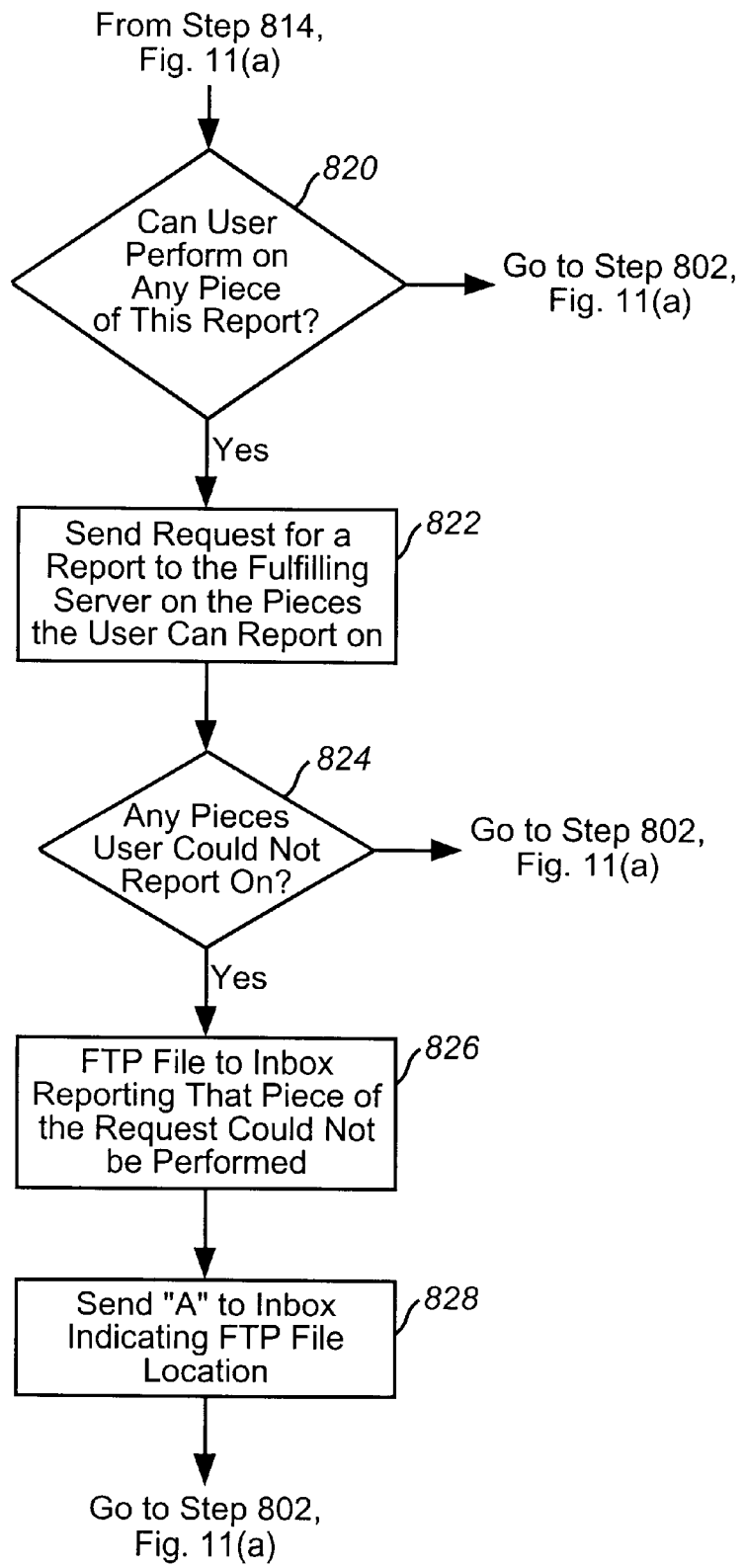

If at step 814 it is determined that the user can perform the report, the process proceeds to step 820, FIG. 11(b) where a determination is made as to whether the user can report on any portion of the report. If the user can not report on any portion then the process ends and returns to the report scheduler process at step 802. If the user can report on any portion then at step 822, a request is sent to the fulfilling server to execute that portion of the report that the user is entitled. A determination as to whether there were portions of the report that could not be performed is then made at step 824. If there were portions that could not be reported, a file is FTP'd to the Inbox server at step 826 to report to the customer that portion of the request that could not be reported. That is, any hierarchies or 800 numbers that are no longer valid for the customer are removed from the ARD and placed in the Hierarchy Notification report, and added to the user's inbox. The Report Scheduler performs the FTP of the report/data file to a known directory on the Inbox server, i.e., a "push" from Report Scheduler to the Inbox. A directory is pre-defined on the Inbox server for the Report Scheduler, e.g., /inbox/files/rs.

Afterwards, at step 828, an "A" message is sent to the Inbox indicating the FTP file location, and the process repeats by returning to step 802. If there were no portions that could not be reported, the process proceeds to step 802.

Figure 12:
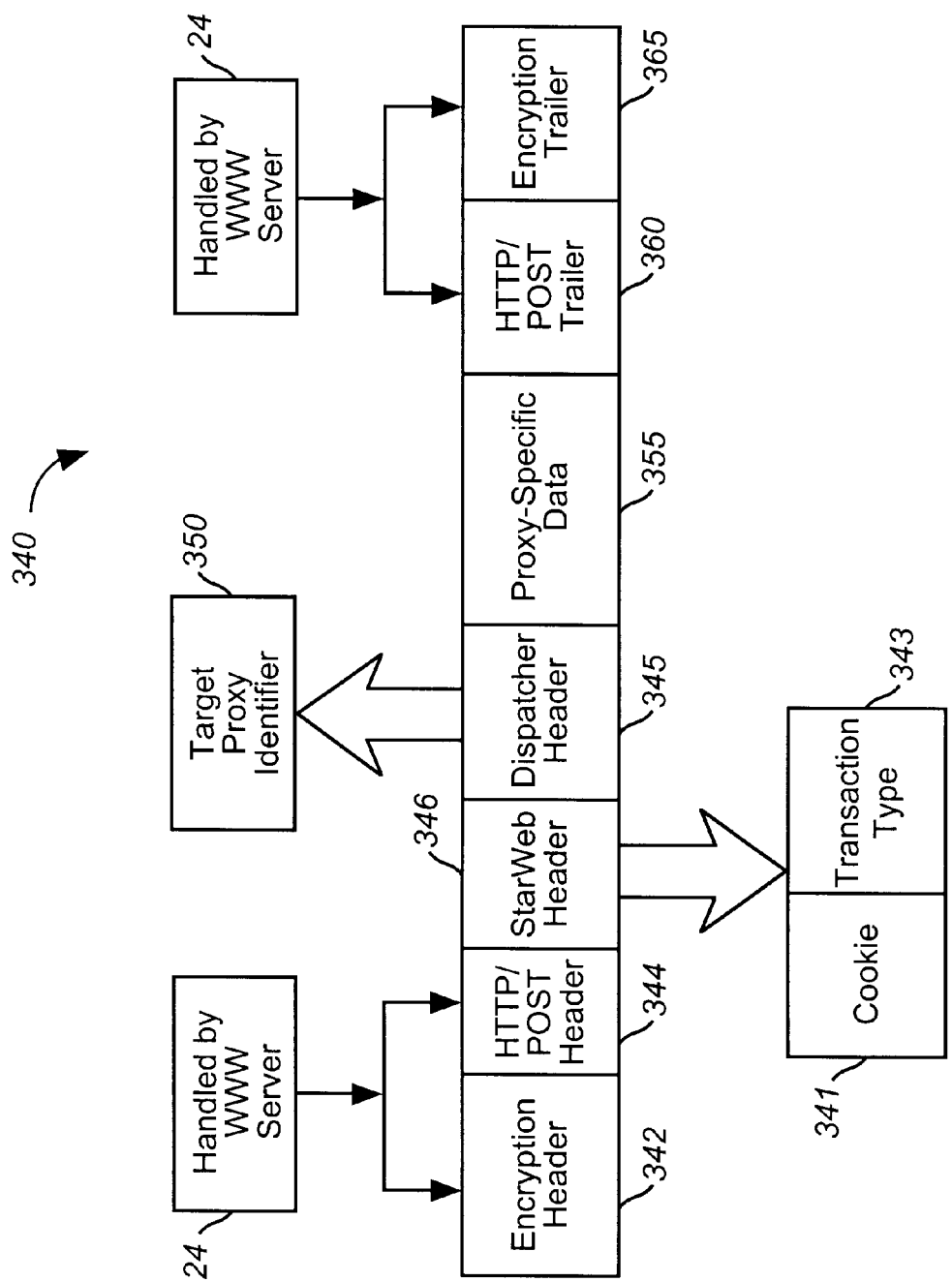
FIG. 12 illustrates a logical message format sent from the client browser to the desired middle tier server for a particular application.

As mentioned herein with respect to FIG. 2, the messages created by the client Java software are transmitted to the StarWeb (DMZ) Server 24 over HTTPS. For incoming (client-to-server) communications, the DMZ Web servers 24 decrypt a request, authenticate and verify the session information. The logical message format from the client to the Web server is shown as follows:

‖TCP/IP‖encryption‖http‖web header‖dispatcher header‖proxy-specific data‖where "‖" separates a logical protocol level, and protocols nested from left to right. FIG. 12 illustrates a specific message sent from the client browser to the desired middle tier server for the particular application. As shown in FIG. 12, the client message 340 includes an SSL encryption header 342 and a network-level protocol HTTP/POST header 344 which are decrypted by the DMZ StarWeb Server (s) 24 to access the underlying message; a DMZ Web header 346 which is used to generate a cookie 341 and transaction type identifier 343 for managing the client/server session; a dispatcher header 345 which includes the target proxy identifier 350 associated with the particular type of transaction requested; proxy specific data 355 including the application specific metadata utilized by the target proxy to form the particular messages for the particular middle tier server providing a service; and, the network-level HTTP/POST trailer 360 and encryption trailer 365 which are also decrypted by the DMZ Web server layer 24.

After establishing that the request has come from a valid user and mapping the request to its associated session, the request is then forwarded through the firewall 25 over a socket connection 23 to one or more decode/dispatch servers 26 located within the corporate Intranet 30. The messaging sent to the Dispatcher will include the user identifier and session information, the target proxy identifier, and the proxy specific data. The decode/dispatch server 26 authenticates the user's access to the desired middle-tier service.

As shown in FIG. 12, the StarWeb server forwards the Dispatcher header and proxy-specific data to the Dispatcher, "enriched" with the identity of the user (and any other session-related information) as provided by the session data/cookie mapping, the target proxy identifier and the proxy-specific data. The dispatch server 26 receives the requests forwarded by the Web server(s) 24 and dispatches them to the appropriate application server proxies. Particularly, as explained generally above with respect to FIG. 6, the dispatch server 26 receives request messages forwarded by the DMZ Web servers and dispatches them to the appropriate server aft proxies. The message wrappers are examined, revealing the user and the target middle-tier service for the request. A first-level validation is performed, making sure that the user is entitled to communicate with the desired service. The user's entitlements in this regard are fetched by the dispatch server from Order Entry server 280 at logon time and cached. Assuming that the Requestor is authorized to communicate with the target service, the message is then forwarded to the desired service's proxy, which, in the accordance with the principles described herein, comprises: 1) a report manager proxy 250' corresponding to the RM Server 250, 2) a report scheduler proxy 260' corresponding to the RS Server 260, and 3) an inbox server proxy 270' corresponding to the Inbox Server 270. Each of these proxy processes further performs: a validation process for examining incoming requests and confirming that they include validly formatted messages for the service with acceptable parameters; a translation process for translating a message into an underlying message or networking protocol; and, a management process for managing the communication of the specific customer request with the middle-tier server to actually get the request serviced. Data returned from the middle-tier server is translated back to client format, if necessary, and returned to the dispatch server as a response to the request.

Figure 13A:
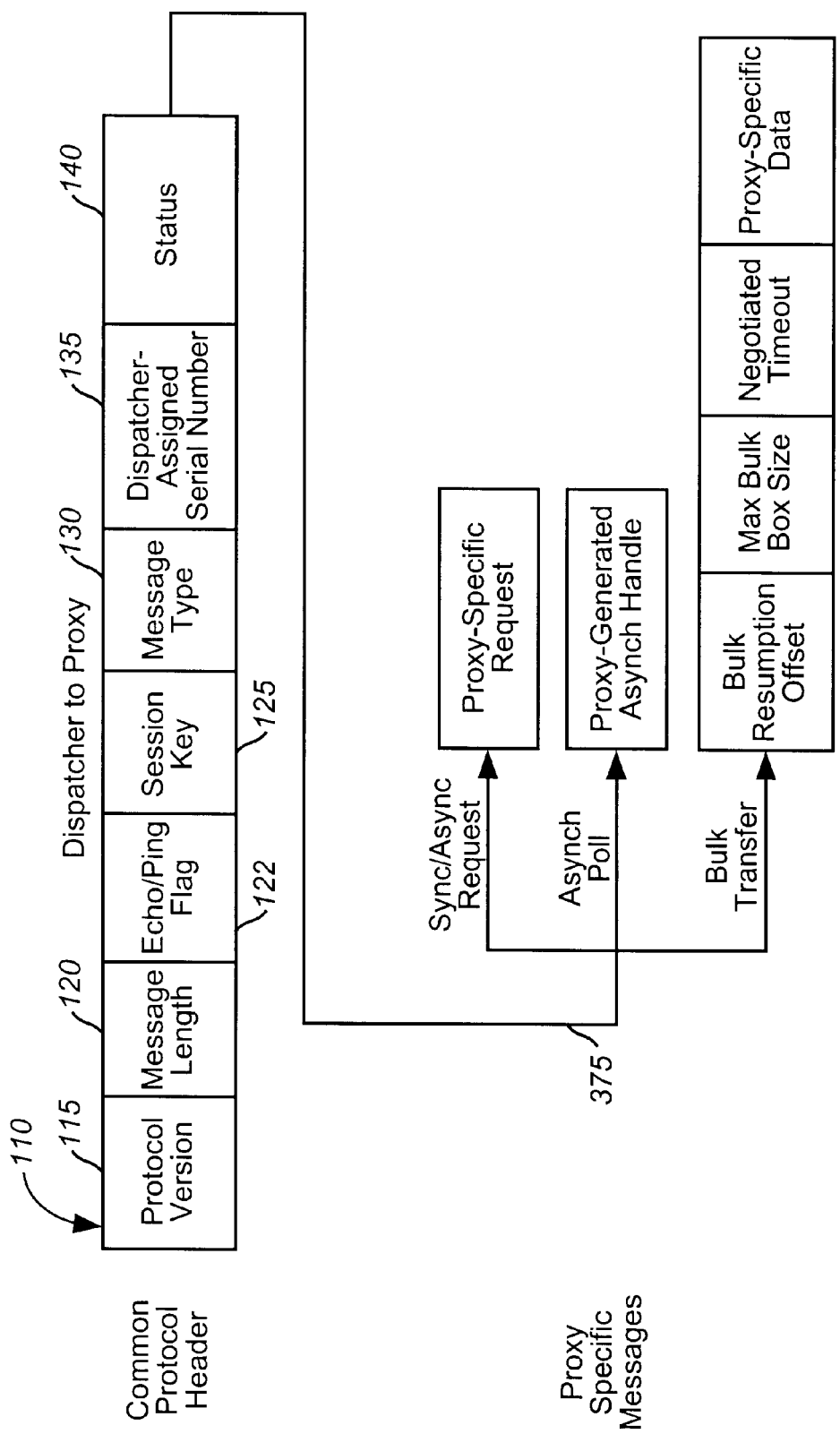
FIGS. 13(a) and 13(b) are schematic illustrations showing the message format passed between the Dispatcher server and the application specific proxy (FIG. 13(a)), and the message format passed between the application specific proxy back to the Dispatcher server (FIG. 13(b)).
Figure 13B:
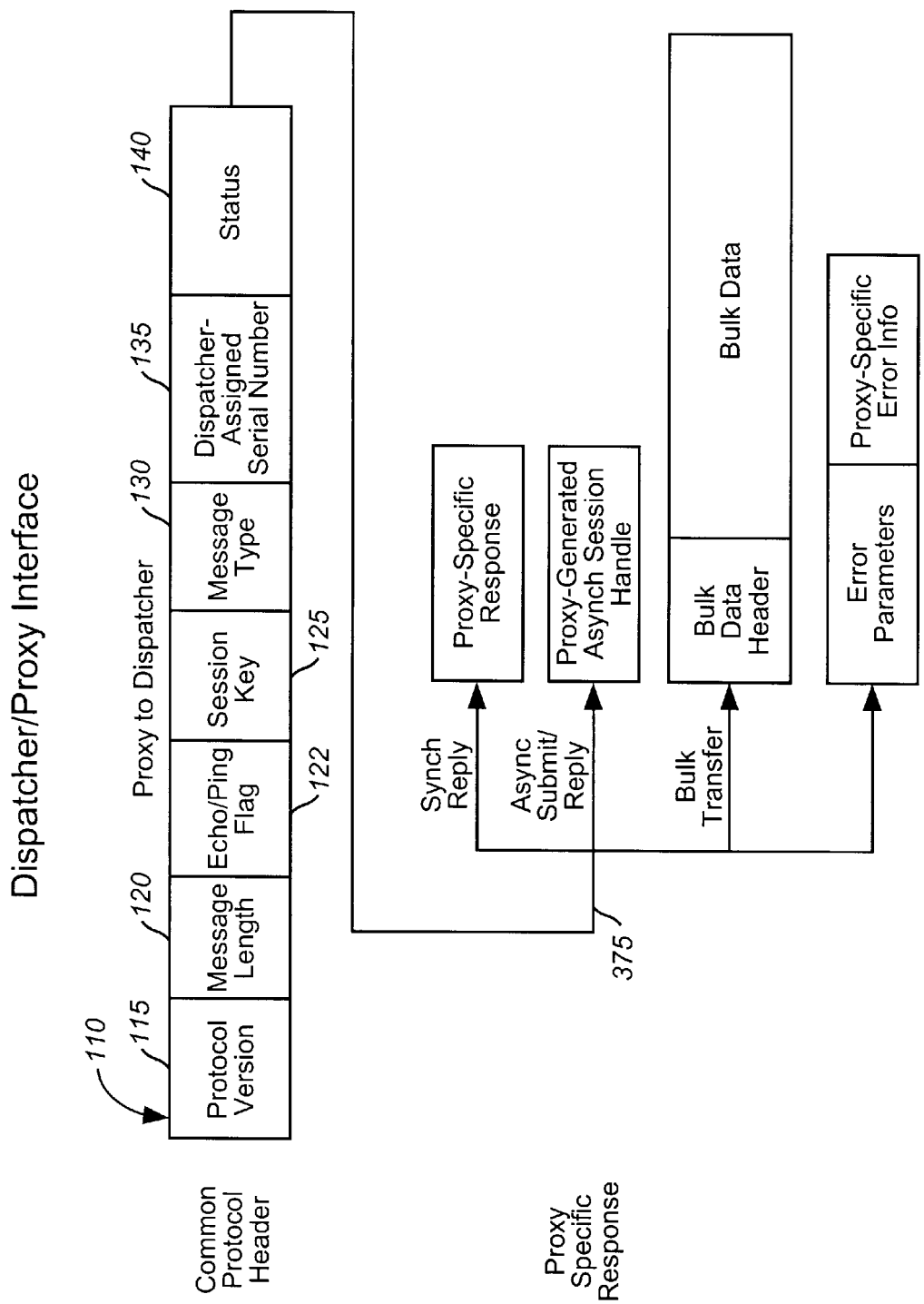

FIG. 13(a) and 13(b) are schematic illustrations showing the message format passed Ibetween the Dispatcher 26 and the application specific proxy (FIG. 13(a)) and the message format passed between the application specific proxy back to the Dispatcher 26 (FIG. 13(b)). As shown in FIG. 13(a), all messages between the Dispatcher and the Proxies, in both directions, begin with a common header 110 to allow leverage of common code for processing the messages. A first portion of the header includes the protocol version 115 which may comprise a byte of data for identifying version control for the protocol, i.e., the message format itself, and is intended to prevent undesired mismatches in versions of the dispatcher and proxies. The next portion includes the message length 120 which, preferably, is a 32-bit integer providing the total length of the message including all headers. Next is the echo/ping flag portion 122 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 125 which is the unique session key or "cookie" provided by the Web browser and used to uniquely identify the session at the browser. As described above, since the communications middleware is capable of supporting four types of transport mechanisms, the next portion of the common protocol header indicates the message type/mechanism 130 which may be one of four values indicating one of the following four message mechanisms and types: 1) Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 135 that is unique across all dispatcher processes and needs to be coordinated across processes (like the Web cookie (see above)), and, further, is used to allow for failover and process migration and enable multiplexing control between the proxies and dispatcher, if desired. A field 140 indicates the status is unused in the request header but is used in the response header to indicate the success or failure of the requested transaction. More complete error data will be included in the specific error message returned. The status field 140 is included to maintain consistency between requests and replies. As shown in FIG. 13(a), the proxy specific messages 375 are the metadata message requests from the report requester client and can be transmitted via synchronous, asynchronous or bulk transfer mechanisms. Likewise, the proxy specific responses are metadata response messages 380 again, capable of being transmitted via a synch, asynch or bulk transfer transport mechanism.

It should be understood that the application server proxies can either reside on the dispatch server 26 itself, or, preferably, can be resident on the middle-tier application server, i.e., the dispatcher front end code can locate proxies resident on other servers.

As mentioned, the proxy validation process includes parsing incoming requests, analyzing them, and confirming that they include validly formatted messages for the service with acceptable parameters. If necessary, the message is translated into an underlying message or networking protocol. A list of Report Manager and Inbox proxy error messages can be found in Appendix E. If no errors are found, the proxy then manages the communication with the middle-tier server to actually get the request serviced. The application proxy supports application specific translation and communication with the back-end application server for both the Web Server (java applet originated) messages and application server messages.

Particularly, in performing the verification, translation and communication functions, the Report Manager server, the Report Scheduler server and Inbox server proxies each employ front end proxy C++ objects and components. For instance, a utils.c program and a C++ components library, is provided for implementing general functions/objects. Various C++ parser objects are invoked which are part of an object class used as a repository for the RM metadata and parses the string it receives. The class has a build member function which reads the string which contains the data to store. After a message is received, the parser object is created in the RMDispatcher.c object which is file containing the business logic for handling metadata messages at the back-end. It uses the services of an RMParser class. Upon determining that the client has sent a valid message, the appropriate member function is invoked to service the request. Invocation occurs in MCIRMServerSocket.C when an incoming message is received and is determined not to be a talarian message. RMSErverSocket.c is a class implementing the message management feature in the Report Manager server. Public inheritance is from MCIServerSocket in order to create a specific instance of this object. This object is created in the main loop and is called when a message needs to be sent and received; a Socket.c class implementing client type sockets under Unix using, e.g., TCP/IP or TCP/UDP. Socket.C is inherited by ClientSocket.C:: Socket (theSocketType, thePortNum) and ServerSocket.C:: Socket (theSocketType, thePortNum) when ClientSocket or ServerSocket is created. A ServerSocket.c class implements client type sockets under Unix using either TCP/IP or TCP/UDP. ServerSocket.C is inherited by RMServerSocket when RMServerSocket is created. An InboxParser.c class used as a repository for the RM Metadata. The class' "build" member function reads the string which contains the data to store and the class parses the string it receives. After a message has been received, the MCIInboxParser object is created in inboxutl.c which is a file containing the functions which process the Inbox requests, i.e, Add, Delete, List, Fetch and Update. Additional objects/classes include: Environ.c which provides access to a UNIX environment; Process.c which provides a mechanism to spawn slave processes in the UNIX environment; Daemon.c for enabling a process to become a daemon; Exception.c for exception handling in C++ programs; and, RMlog.c for facilitating RM logging. In addition custom ESQL code for RM/database interface is provided which includes the ESQC C interface (Informix) stored procedures for performing the ARD, DRD, DUR, URS, GRD, CRD, GPL, and GRINF messages. The functions call the stored procedures according to the message, and the response is build inside the functions depending on the returned values of the stored procedures. A mainsql.c program provides the ESQL C interface for messages from the report manager and report viewer.

Figure 14A:
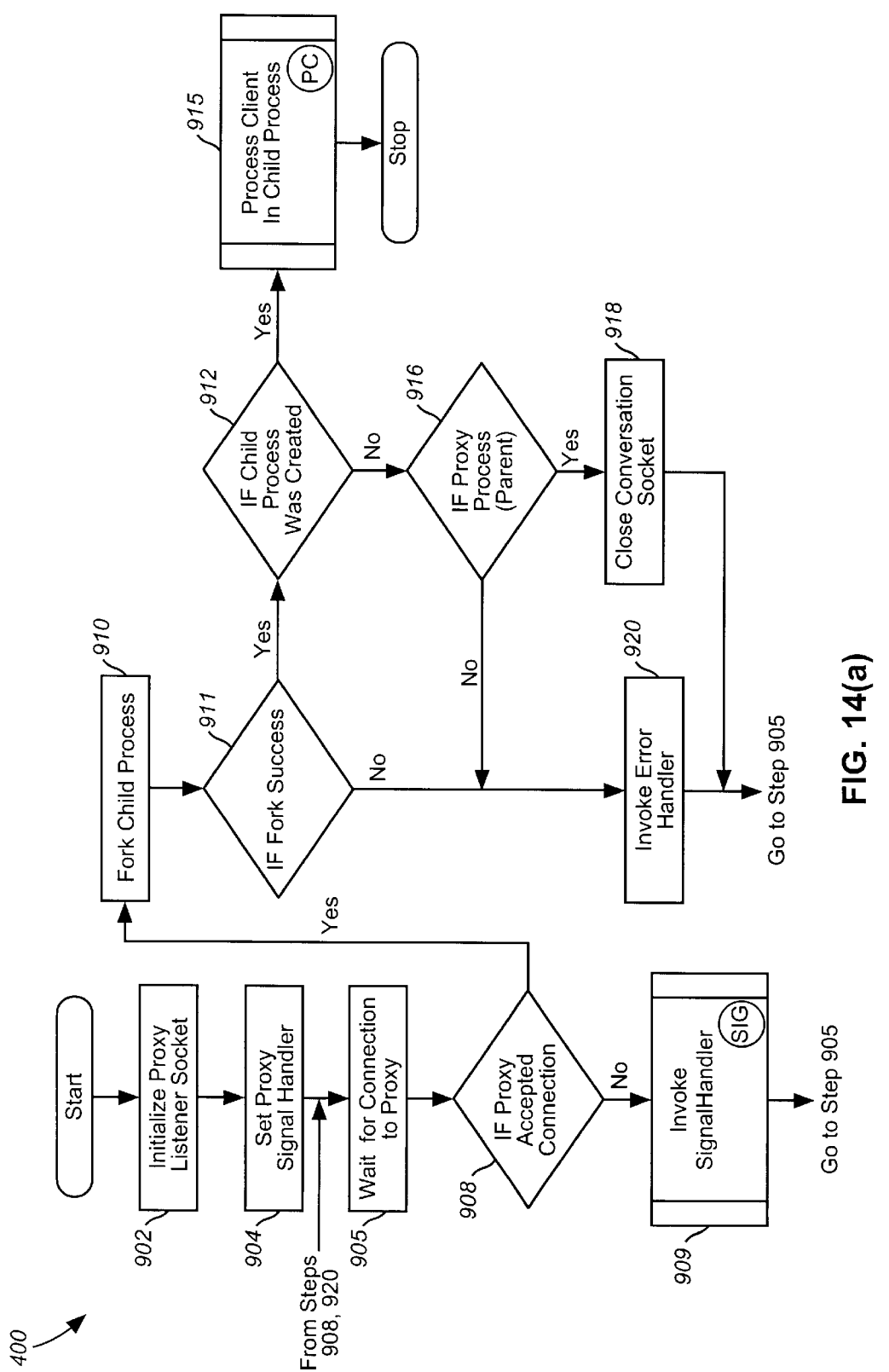
FIGS. 14(a)–14(c) illustrate a low level logic diagram depicting the multi-threaded proxy process.
Figure 14B:
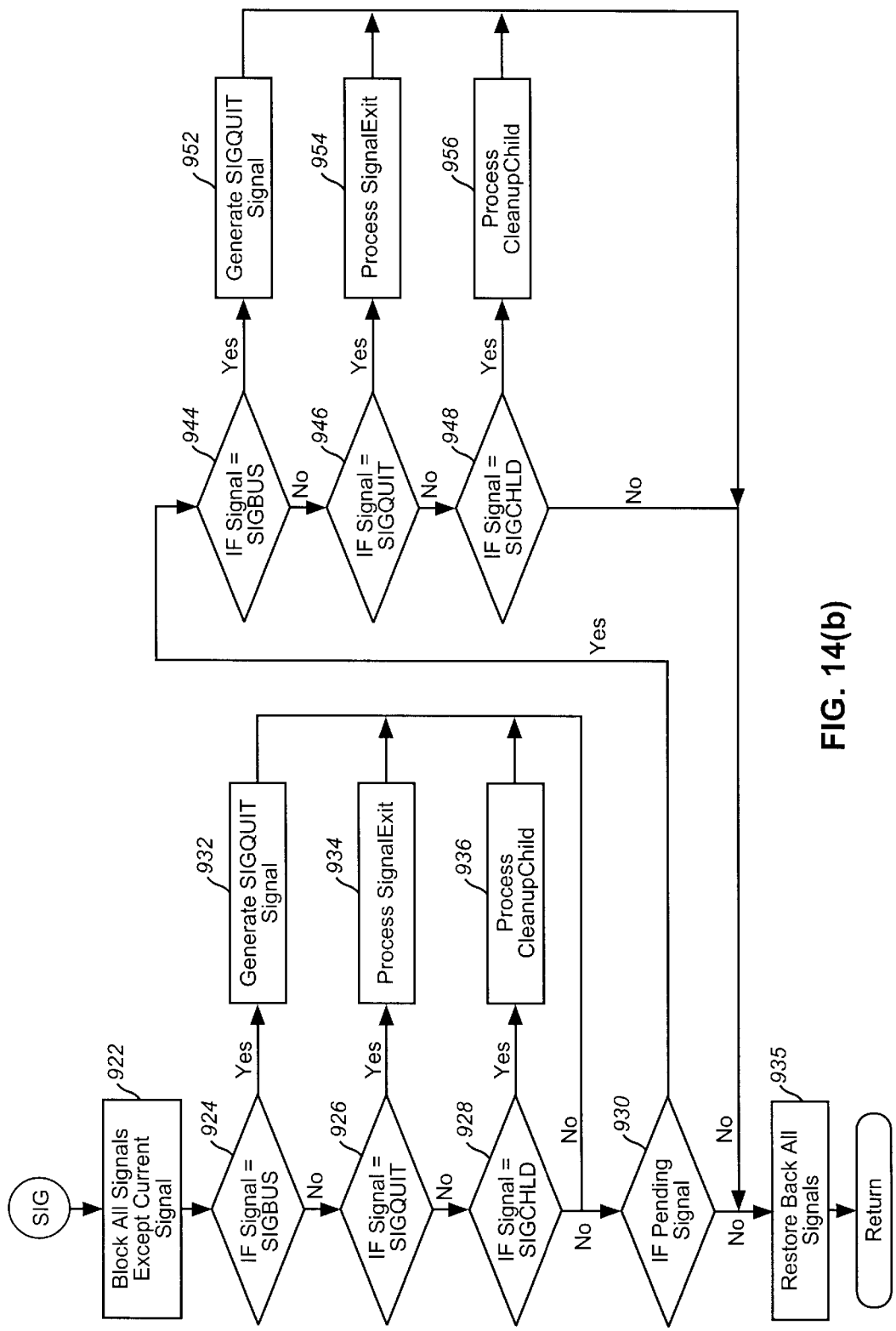
Figure 14C:
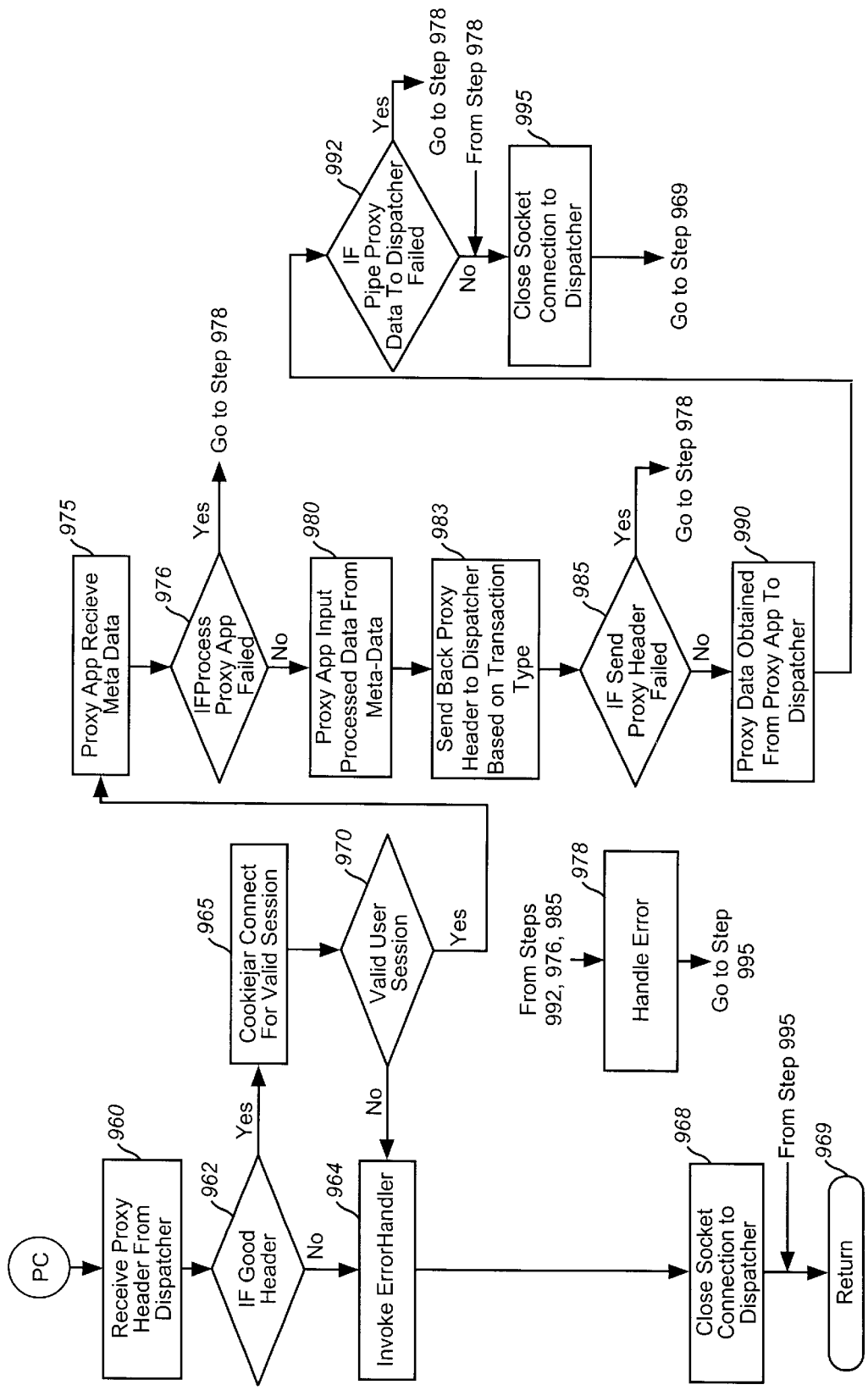

These utilities enable multi-threaded proxy functionality as illustrated in the logic flow diagram 900 of FIGS. 14(a)–14(c).

Specifically, as shown in FIG. 14(a), step 902, a proxy listener socket on a middle-tier server, e.g., report manager server, is first initialized. A proxy signal handler is invoked at step 904 to set all of the signals that the proxy is interested in handling. Then, as indicated at step 905, it waits for a connection signal from the dispatcher server, as indicated at step 905. At step 908, a determination is made as to whether the Proxy has accepted a connection request from the dispatcher. If the proxy could not accept the connection, a SignalHandler Routine is invoked as indicated at step 908 and described with reference to FIG. 14(b). If the proxy accepts the connection, a child process is instantiated as indicated at step 910. A determination is next made at step 911 to determine if the forked process was successful. If the forked process was successful, then a check is made at step 912 to determine if the child process was created for that session. If the child process was created, then the child process is invoked at step 915 as described with reference to FIG. 14(c). If the child process was not created, a determination is made at step 916 to determine whether the parent proxy process is still executing. If the parent is still executing, then the current conversation socket is closed, as indicated at step 918, and the process returns to step 905. If the parent is not alive, then an error handler routine is invoked at step 920, and the process returns to step 905.

Returning back to step 908, if the proxy could not accept a connection request, the Signal Handler routine is described with reference to FIG. 14(b). As shown at step 922, the SignalHandler routine first blocks all signals except the current signal. Then at step 922 a determination is made at step 924 as to whether the received signal is equal to the "SIGBUS" indicating a bus failure. If the received signal is not equal to SIGBUS, then a determination is made at step 926 as to whether the received signal is equal to the "SIGQUIT", e.g., indicating a quit command. If the received signal is not equal to SIGQUIT, then a determination is made at step 928 as to whether the received signal is equal to the "SIGCHLD". If the received signal is not equal to SIGCHLD, then a determination is made at step 930 as to whether a signal is pending.

If, at step 924, it is determined that the received signal is equal to SIGBUS, then the process quit signal "SIGQUIT" is generated at step 932, and the process returns to step 930. If, at step 926, it is determined that the received signal is equal to "SIGQUIT", then a SignalExit process is invoked to exit the process, as indicated at step 934, and the process returns to step 930. If, at step 928, it is determined that the received signal is equal to "SIGCHLD", then a CleanupChild process is invoked to free-up the resource that the child process had used, as indicated at step 936, and the process returns to step 930. If none of these signals were generated and no signals are pending, then at step 935 all signals are restored and the process returns to step 905, FIG. 14(a).

If it is determined that a signal is pending at step 930, then the process proceeds to step 944. At step 944, a determination is made as to whether the received signal is equal to the SIGBUS indicating a bus error. If the received signal is not equal to SIGBUS, then a determination is made at step 946 as to whether the received signal is equal to the SIGQUIT. If the received signal is not equal to SIGQUIT, then a determination is made at step 948 as to whether the received signal is equal to the SIGCHLD. If the received signal is not equal to SIGCHLD, then the process proceeds to step 935 where all signals are restored and the process returns to step 905, FIG. 14(a).

If, at step 944, it is determined that the received signal is equal to SIGBUS, then a SIGQUIT signal is generated at step 952, and the process returns to step 935. If, at step 946, it is determined that the received signal is equal to SIGQUIT, then a SignalExit process is invoked as indicated at step 954, and the process returns to step 935. If, at step 948, it is determined that the received signal is equal to SIGCHLD, then a CleanupChild process is invoked to free up the resource that the child had used, as indicated at step 956, and the process returns to step 935. If none of these signals were generated all signals are restored at step 935 and the process returns to step 905, FIG. 14(a).

Referring back to FIG. 14(a), the client request is processed by the forked child process as indicated at step 915. This procedure is described with reference to FIG. 14(c) where, at step 960, the proxy header is received from the Dispatcher. If the header does not conform to the protocol, then at step 964, an error handling routine is invoked, and the socket connection to the Dispatcher is closed, as indicated at step 968, and the process terminates by returning at step 969 to the invoking procedure (FIG. 14(a)). If the header conforms to the messaging protocol as determined at step 962, then a validation step is performed at step 965 wherein a connection to the Web server cookie jar is implemented to determine the validity of the current session. Next, a determination is made at step 970 as to whether the current session is a valid user session. If the current session is validated, then the process proceeds to step 975. Otherwise the process proceeds to step 968 to close the socket connection to the Dispatcher.

At step 975, FIG. 14(c), the proxy application receives the metadata message. At step 976, a determination is made as to whether the process proxy application failed. If the proxy process failed, the program will handle the error as indicated at step 978. If there is no error, the proxy application will input processed data from the meta data descriptions as indicated at step 980, and send back the proxy header to the Dispatcher based on the transaction type, as indicated at step 983. A determination is made at step 985 as to whether an error occurs when sending the proxy header. If an error occurs, the program will handle the error as indicated at step 987 and close the socket connection to the dispatcher server as indicated at step 995. Otherwise, as indicated at step 990, the proxy data obtained from the proxy application is sent to the dispatcher in accordance with the specified transaction mechanism. A determination is made at step 992 as to whether an error occurs when sending the proxy data back to the Dispatcher server. If an error occurs, the program will handle the error as indicated at step 987 and close the socket connection to the dispatcher as indicated at step 995. If the transmission is successful, the socket connection to the Dispatcher server closes, as indicated at step 995 and the process returns to step 905, FIG. 14(a), to await the next proxy connection request.

Outgoing (server-to-client) communications follow the reverse route, i.e., the proxies feed responses to the decode/dispatch server and communicate them to the DMZ Web servers over the socket connection. The Web servers will forward the information to the client using SSL. The logical message format returned to the client from the middle tier service is shown as follows:

‖TCP/IP‖encryption‖http‖web response‖dispatcher response‖proxy-specific response‖ where "‖" separates a logical protocol level, and protocols nested from left to right.

The foregoing merely illustrates the principles of the present invention. Those skilled in the art will be able to devise various modifications, which although not explicitly described or shown herein, embody the principles of the invention and are thus within its spirit and scope. For instance, although, the web/Internet reporting system tool described herein is employed for customer's of a telecommunications network, it can be readily implemented for any type of application requiring the secure handling of report requests over the web/Internet and the secure generation and presentation of reports for downloading over the Web/Internet.

What is claimed is:

1. An Internet based reporting system for communicating customer-specific data retrieved from an enterprise fulfilling server to a client workstation via an integrated interface, said system comprising:

a client browser application located at said client workstation for enabling interactive Internet-based communications with said reporting system, said client workstation identified with a customer and providing said integrated interface;

at least one secure server for managing client sessions over the Internet, said secure server supporting a secure socket connection enabling encrypted communication between'said client browser application and said secure server;

a report requestor object presenting one or more selectable reporting options for said customer in accordance with pre-determined customer entitlements, said requester object generating a report request message in response to user selection of a specific reporting option for communication to a secure server over said secure socket connection;

a report manager server for maintaining an inventory of reports associated with a customer and receiving said report request message, said report manager server accessing report items in response to a request message and generating a response message including a metadata description of reporting items for a requested report, said response message and associated customer-specific data being communicated to a storage device associated with said client workstation over said secure socket connection;

wherein said retrieved data and said metadata description of reporting items are utilized to generate a completed report for presentation to said customer via said interface, said completed report including an amount of usage of telecommunications services by the customer.

2. The reporting system as claimed in claim 1, further including a scheduler server for initiating retrieval of said data associated with said particular report from said enterprise fulfilling server.

3. The reporting system as claimed in claim 2, wherein said report requestor object includes a requestor applet downloaded from said web server to said client workstation, said applet capable of presenting said reporting options for said user on said client workstation in accordance with a report metadata message input.

4. The reporting system as claimed in claim 2, wherein said scheduler server enables said customer to schedule execution of a report by said fulfilling server at a user-specified frequency.

5. The reporting system as claimed in claim 4, wherein said reporting options includes report creation and report customization, said report manager server providing a list of reporting templates for a particular report product when creating a report, said report manager server further providing formatted metadata responses including said list and associated customization criteria in accordance with customer entitlements to enable customization of a created report.

6. The reporting system as claimed in claim 5, wherein said report requestor object further generates a report request message enabling said report manager server to provide a list of existing reports associated with said customer in accordance with a reporting product, said report manager providing formatted metadata responses including said list to enable said report customization.

7. The reporting system as claimed in claim 6, wherein a modification includes enabling re-scheduling of an existing report.

8. The reporting system as claimed in claim 4, wherein said scheduler server communicates with said report manager server to save a metadata description of a modified or customized report.

9. The reporting system as claimed in claim 4, wherein said reporting option includes running an existing report, said report scheduler submitting a message to a said fulfilling server to run it at a pre-determined time.

10. The reporting system as claimed in claim 1, further including device for supporting one or more socket communications transport options, said device providing an indication of a type of communications transport in said request message, said response data being communicated back to said report requestor object in accordance with said communication transport option.

11. The reporting system as claimed in claim 1, wherein said transport mechanism is one selected from asynchronous, synchronous and bulk transfer communication transport mechanisms.

12. The reporting system as claimed in claim 1, further including an administrative server including a representation of reporting entitlements associated with said customer, said browser application communicating with said administrative server for obtaining said list of reports to which said user is entitled.

13. The reporting system as claimed in claim 12, wherein said fulfilling server pushes report data to a memory storage device and notifies said report manager server as to the location of said report data.

14. The reporting system as claimed in claim 13, further including a report viewing device for accessing said retrieved data of a requested report from said memory storage location in accordance with a metadata description of said report.

15. The reporting system as claimed in claim 1, further including parsing object for parsing metadata request messages received from said report requestor object to access items from said message directing said report manager to retrieve requested reports and report items from said report inventory.

16. The reporting system as claimed in claim 1, wherein said enterprise is a telecommunications service provider, said fulfilling server of said enterprise for generating priced call detail data pertaining to a customer's telecommunications network usage.

17. The reporting system as claimed in claim 1, wherein said fulfilling server generates un-priced call detail and statistical data pertaining to a customer's telecommunications network usage.

18. The reporting system as claimed in claim 14, wherein said metadata message places said report data in a form enabling said report viewing device to present said data in a spread sheet format.

19. The reporting system as claimed in claim 18, wherein said report viewing device enables roll-up of report data.

20. The reporting system as claimed in claim 18, wherein said report viewing device enables drill-down of report data.

21. A method for generating reports comprising customer-specific data for presentation via a Internet-based integrated interface, said integrated interface including a client browser application located at a client workstation for enabling interactive Internet-based communications between said customer and said integrated interface, said method comprising:

managing a client session over the Internet by providing a first server device capable of supporting a secure socket connection enabling encrypted communication between said client browser application and said first server;

providing a second server device for communicating with said first server device through a firewall over a second socket connection, said first secure socket and second socket connection forming a secure communications link for enabling forwarding of report request messages and associated report response messages;

presenting at said client workstation a report request menu including various user-selectable reporting options for said customer in accordance with customer entitlements;

generating a said report request message having said user-selected reporting options, said request message being communicated over said secure communications link;

maintaining an inventory of reports associated with a customer and accessing report items in accordance with said report request message;

generating a response message including a metadata description of said report items selected by a user;

communicating said response message and said customer-specific data to a storage device associated with said client workstation over said communications link; and generating a report at said client workstation from said communicated data and said metadata description of said report, said report including an amount of usage of telecommunications services by the customer.

22. The method as claimed in claim 21, further including scheduling retrieval of customer specific data associated with said particular report from said enterprise fulfilling server.

23. The method as claimed in claim 21, wherein said step of generating a report request message includes downloading an applet from said first server device to said client workstation, said applet being executed to present said reporting options for said user at said client workstation.

24. The method as claimed in claim 22, further including the step of scheduling execution of a report by said fulfilling server at a user-specified frequency.

25. The method as claimed in claim 22, wherein said reporting options include report creation and report customization, said step of generating a said report request message including generating a formatted message request for a report manager to provide a list of reporting templates for a particular report product, said report manager providing formatted metadata responses including said list of templates and associated customization criteria in accordance with customer entitlements to enable customization of a created report.

26. The method as claimed in claim 25, wherein said customization includes providing messaging to enabling re-scheduling of an existing report.

* * * * *